United States Patent
Guo et al.

(10) Patent No.: US 7,492,815 B2
(45) Date of Patent: Feb. 17, 2009

(54) REDUCED PARALLEL AND PIPELINED HIGH-ORDER MIMO LMMSE RECEIVER ARCHITECTURE

(75) Inventors: Yuanbin Guo, Richardson, TX (US); Jianzhong Zhang, Irving, TX (US); Dennis McCain, Lewisville, TX (US); Joseph R. Cavallaro, Pearland, TX (US)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 10/997,397

(22) Filed: Nov. 24, 2004

(65) Prior Publication Data

US 2006/0109891 A1   May 25, 2006

(51) Int. Cl.
*H04B 1/707* (2006.01)
*H03H 7/30* (2006.01)
(52) U.S. Cl. ........................ 375/229; 375/147; 375/232
(58) Field of Classification Search ................. 375/147, 375/148, 229, 232, 233, 260; 370/342; 455/70, 455/101
See application file for complete search history.

(56) References Cited

U.S. PATENT DOCUMENTS

| | | | | |
|---|---|---|---|---|
| 6,954,495 B2 * | 10/2005 | Piirainen | ..................... | 375/233 |
| 2003/0026345 A1 * | 2/2003 | Muharemovic et al. | ..... | 375/260 |
| 2004/0228392 A1 | 11/2004 | Zhang et al. | ................. | 375/148 |
| 2005/0053172 A1 * | 3/2005 | Heikkila | ..................... | 375/333 |
| 2005/0180493 A1 * | 8/2005 | Hooli et al. | .................. | 375/148 |
| 2005/0281323 A1 * | 12/2005 | Mailaender | .................. | 375/147 |

OTHER PUBLICATIONS

Guo et al., Scalable FPGA Architectures for LMMSE-based SIMO Chip Equalizer in HSDPA Downlink, Nov. 9-12, 2003, Signals, Systems and Computers, 2003. Conference Record of the Thirty-Seventh Asilomar Conference on, vol. 2, pp. 2171-2175.*

Guo et al., FFT-Accelerated Iterative MIMO Chip Equalizer Architecture for CDMA Downlink, Mar. 18-23, 2005, Acoustics, Speech, and Signal Processing, 2005. Proceedings, (ICASSP '05). IEEE International Conference on, vol. 3, pp. 1005-1008.*

(Continued)

*Primary Examiner*—Mohammad H Ghayour
*Assistant Examiner*—Lawrence B Williams
(74) *Attorney, Agent, or Firm*—Harrington & Smith, PC

(57) ABSTRACT

Disclosed is a LMMSE receiver that restores orthogonality of spreading codes in the downlink channel for a spread spectrum signal received over N receive antennas. The FFT-based chip equalizer tap solver reduces the direct matrix inverse of the prior art to the inverse of some submatrices of size N×N with the dimension of the receive antennas, and most efficiently reduces matrix inverses to no larger than 2×2. Complexity is further reduced over a conventional Fast Fourier Transform approach by Hermitian optimization to the inverse of submatrices and tree pruning. For a receiver with N=4 or N=2 with double oversampling, the resulting 4×4 matrices are partitioned into 2×2 block sub-matrices, inverted, and rebuilt into a 4×4 matrix. Common computations are found and repeated computations are eliminated to improve efficiency. Generic design architecture is derived from the special design blocks to eliminate redundancies in complex operations. Optimally, the architecture is parallel and pipelined.

35 Claims, 8 Drawing Sheets

OTHER PUBLICATIONS

Guo et al., Efficient MIMO Equalization for Downlink Multi-Code CDMA: Complexity Optimization and Comparative Study, Nov. 29-Dec. 3, 2004Global Telecommunications Conference, 2004, GLOBECOM '04. IEEE, vol. 4, pp. 2513-2519.*

Foschini, Gerard J., "Layered Space-Time Architecture for Wireless Communication in a Fading Environment When Using Multi-Element Antennas", Bell Labs Technical Journal, 1996, pp. 41-59.

Hooli, Jari, et al., "Chip-Level Channel Equalization in WCDMA Downlink", BURASIP Journal on Applied Signal Processing, 2002, pp. 757-770.

Guo, Yuanbin, et al., "Efficient MIMO Equalization for Downlink Multi-Code CDMA: Complexity Optimization and Comparative Study", IEEE 2004, pp. 2513-2519.

Guo, Yuanbin, et al., "Scalable FPGA Architectures for LMMSE-based SIMO Chip Equalizer in HSDPA Downlink", 37th IEEE Asilomar Conference on Signals, Systems and Computers, 2003, 5 pages.

Kermoal, Jean Philippe et al., "A Stochastic MIMO Radio Channel Model With Experimental Validation", IEEE Journal On Selected Areas In Communications, vol. 20, No. 6, Aug. 2002, pp. 1211-1226.

Golden, G.D. et al., "Detection algorithm and initial laboratory results using V-BLAST space-time communication architecture", Electronics Letters, vol. 35, Jan. 1999, pp. 14-15.

Wiesel, Ami et al., "Turbo linear dispersion space time coding for MIMO HSDPA systems", 12th 1st Summit on Mobile and Wireless Communications, Jun. 15-18, 2003, Aveiro, Portugal, 5 pages.

Radosavljevic, Predrag et al., "ASIP Architecture Implementation of Channel Equalization Algorithms for MIMO Systems In WCDMA Downlink", IEEE 2004, pp. 1735-1739.

Krauss, Thomas P., et al. "MMSE Equalization For Forward Link In 3G CDMA: Symbol-Level Versus Chip-Level", IEEE 2000, pp. 18-22.

Heikkila, Markku J. et al., "Space-Time Equalization Using Conjugate-Gradient Algorithm In WCDMA Downlink", IEEE 2002, pp. 673-677.

Zhang, Jianzhong, et al., "Efficient Linear Equalization for High Data Rate Downlink CDMA Signaling", IEEE2003, pp. 141-145.

* cited by examiner

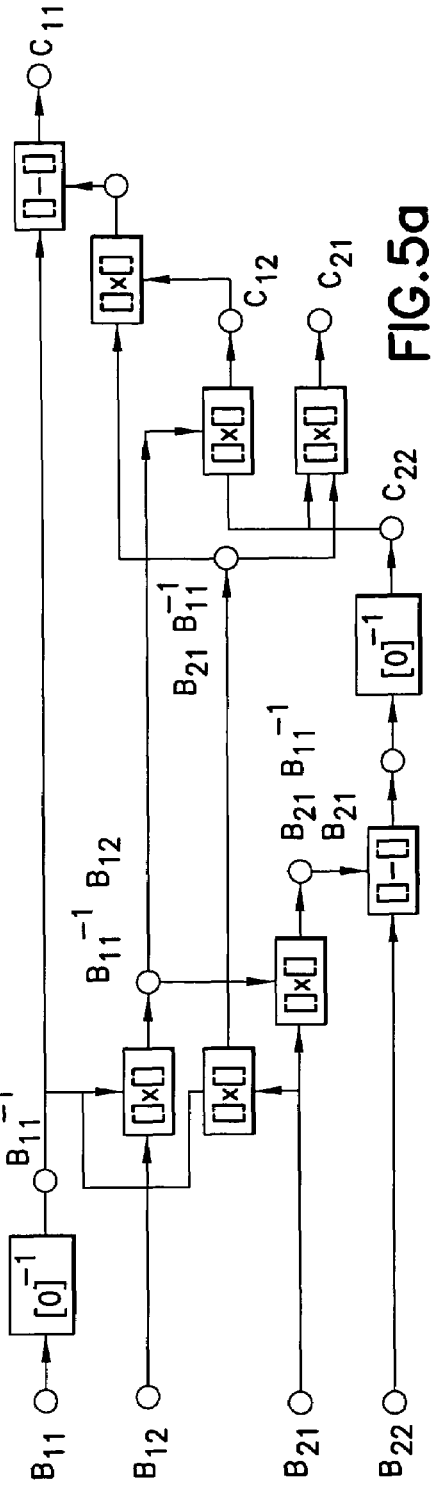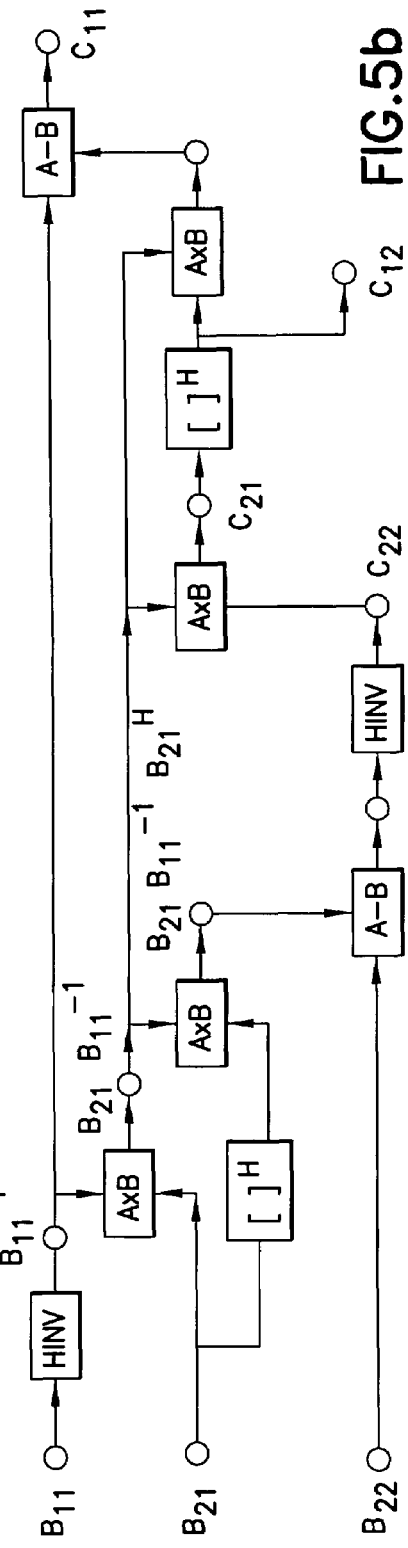

THE DATA DEPENDENCY PATH FOR THE SUB-BLOCK-BASED HERMITIAN MATRIX INVERSE USING GENERIC DESIGN BLOCKS T AND M, HINV

REDUCED PARALLEL AND PIPELINED HIGH-ORDER MIMO LMMSE RECEIVER ARCHITECTURE

FIELD OF THE INVENTION

The present invention relates generally to receivers and related methods for a spread spectrum communication system using multiple transmit and/or multiple receive antennas, and is particularly directed to a receiver using an equalizer, such as a linear minimum mean square error (LMMSE) based equalizer.

BACKGROUND

MIMO (Multiple Input Multiple Output) technology using multiple antennas at both the transmitter and receiver sides has recently emerged as one of the most significant technical breakthroughs in modern communications. The original MIMO is known as D-BLAST (see G. J. Foschini, "Layered space-time architecture for wireless communication in a fading environment when using multielement antennas", *Bell Labs Tech. J.*, pp. 41-59, 1996.) and a more realistic strategy as V-BLAST (see G. D. Golden, J. G. Foschini, R. A. Valenzuela, and P. W. Wolniansky, "DETECTION ALGORITHM AND INITIAL LABORATORY RESULTS USING V-BLAST SPACE-TIME COMMUNICATION ARCHITECTURE," *Electron. Lett.*, vol. 35, pp. 14-15, January 1999) by nulling and canceling with reasonable tradeoff between complexity and performance.

The original MIMO spatial multiplexing was proposed for narrow band and flat-fading channels. In a multipath-fading channel, the orthogonality of the spreading codes is destroyed and the Multiple-Access-Interference (MAI) along with the Inter-Symbol-Interference (ISI) is introduced. With a very short spreading gain, the conventional Rake receiver could not provide acceptable performance. The LMMSE (Linear-Minimum-Mean-Square-Error)-based chip equalizer is promising to restore the orthogonality of the spreading code, so as to suppress both the ISI and MAI. However, the LMMSE equalizers involve the inverse of a large correlation matrix with the general complexity of $O((NF)^3)$, where N is the number of Rx antenna and F is the channel length. This is very expensive for hardware implementation.

Earlier, the chip equalizer problem was solved in either of the following frameworks:
 (i) adaptive stochastic gradient algorithms such as LMS;
 (ii) Conjugate Gradient algorithm; and
 (iii) The FFT-based MIMO chip equalizer.

The algorithms of option (i) suffer from stability problems because the convergence depends on the choice of good step size (see M. J. Heikkila, K. Ruotsalainen and J. Lilleberg, "SPACE-TIME EQUALIZATION USING CONJUGATE-GRADIENT ALGORITHM IN WCDMA DOWNLINK", *IEEE Proceeding in PIMRC*, pp. 673-677, 2002). The algorithms of option (ii) exhibit complexity at the order of $O((NF)^2)$, according to Levinson and Shur. For option (iii), the FFT-based equalizer reduces the (NF×NF) matrix inverse to $L_F$ submatrices inverse of size (N×N) (see J. Zhang, T. Bhatt, G. Mandyam, "EFFICIENT LINEAR EQUALIZATION FOR HIGH DATA RATE DOWNLINK CDMA SIGNALING", *Proceeding of IEEE Asilomar Conference on Signals, Systems and Computers*, 2003).

The FFT-based fast algorithm noted above by Zhang, Bhatt and Mandyam uses a banded-Toeplitz structure of the correlation matrix. Although this FFT-based algorithm avoids the inverse of the original correlation matrix with the dimension of NF×NF, the inventors believe that some matrix inverse is inevitable for the MIMO receiver. For a MIMO receiver with high dimension, the complexity of a MIMO receiver increases dramatically with the number of antennas. The principle operation of interest is the architecture of many 4×4 matrix inverses in the frequency domain for the 1×4, 2×4 and 4×4 MIMO configurations or 1×2, 2×2 receivers with over sampling factor of 2. This is because these are seen to be the most likely deployed in the near future. The fact that the receiver must be embedded into a portable device makes the design of low complexity mobile receivers very critical for widespread commercial deployment of low cost products. For practical considerations, it is necessary to determine which range of possible matrix inverse architectures is most suitable for VLSI implementation.

What is needed in the art is a receiver architecture and corresponding method for reducing receiver complexity in a MIMO system while remaining within constraints imposed by portable wireless devices, mobile stations such as mobile telephones, PDAs with two-way communications, personal internet-access devices, and other such appliances.

SUMMARY OF THE INVENTION

This invention is a method and LMMSE receiver for restoring spreading code orthogonality in a multipath channel signal. An inverse of an overall NF×NF matrix of the prior art is avoided by inverting several sub-matrices of size N×N, where N is the number of receive antennas and F is the channel length parameter. The number and complexity of conventional FFTs design modules is reduced with Hermitian optimization and tree pruning, and the inverse of the sub-matrices are further simplified.

The present invention is in one aspect an equalizer that includes apparatus that generates a set of filter coefficients w from inverting a series of sub-matrices F. Each of the sub-matrices are of size no greater than 2×2, and each represents an element of an approximated correlation matrix $C_{rr}$ for a spread spectrum signal received over a multipath channel.

In another aspect, the present invention is a spread spectrum receiver having a Linear-Minimum-Mean-Square-Error LMMSE-based chip-level equalizer. The equalizer includes a Finite Impulse Response FIR filter coupled to an output of a correlation estimator and tap solver operable to combine Fourier transformed and inverted sub-matrix elements of a block circulant matrix $C_{rr}$ with a Fourier transformed channel matrix H. The block circulant matrix $C_{rr}$ is an approximation of a correlation matrix $R_{rr}$.

In another aspect, the invention is an equalizer that has a correlation estimator and tap solver means. These means have an output coupled to a Finite Impulse Response filter means, and are for executing a Fast Fourier Transform FFT and an inversion on sub-matrix elements of a block circulant matrix $C_{rr}$ and a Fourier transform on a channel matrix $H$,. As above, the block circulant matrix $C_{rr}$ is an approximation of a correlation matrix $R_{rr}$. The correlation estimator and tap solver means are further for combining the Fourier transformed and inverted sub-matrices and the Fourier transformed channel matrix. These correlation estimator and tap solver means invert matrices no greater than 2×2.

In another aspect, the invention is a method to receive a signal from a multipath channel. The method includes receiving the signal with at least two receive antennas, and equalizing the received signal by combining a Fourier transformed channel matrix with a Fourier transformed and inverted sub-matrix elements of a block circulant matrix $C_{rr}$ that is an approximation of a correlation matrix $R_{rr}$.

Other aspects of the invention include streamlining the calculation processing, parallelizing the calculations for the various filter coefficients, and pipelining the various parameters in time to reduce data path lengths and eliminate repeat calculations.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

FIG. 5($a$) is a data dependency path of the partitioned 4×4 matrix inverse.

FIG. 5($b$) is a data dependency of the Hermitian optimized 4×4 matrix inverse.

DETAILED DESCRIPTION

The following acronyms are used herein:
LMMSE: Linear Minimum Mean Squared Error;
CDMA: Code-Division Multiple Access;
SIMO: Single Input Multiple Output;
MIMO: Multiple Input Multiple Output;
FPGA: Field Programmable Gate Array;
VLSI: Very Large Scale Integrated circuit;
ASIC: Application Specific Integrated Circuit;
RTL: Register Transfer Layer;
DSP: Digital Signal Processing;
FFT: Fast Fourier Transform As used herein, the term CDMA refers generically to a spread spectrum communication system unless specifically stated otherwise (e.g., CDMA2000). The operators $[\ ]^T$ and $[\ ]^*$ indicate transpose, and the operator $[\ ]^H$ indicates a Hermitian operation as known in the art. As an overview, the present invention is a reduced complexity FFT-based linear equalizer and further includes a complete parallel VLSI architecture for a proposed MIMO receiver. To further reduce the complexity, Hermitian optimization is disclosed that utilizes the structures of the correlation coefficients and the FFT algorithm. The Hermitian feature is then applied in the inverse of submatrices. A reduced-state FFT module avoids duplicate computation of the symmetric coefficients and the zero coefficients, thereby reducing the number and complexity of conventional FFT design modules.

Of special interest is the partitioned 4×4 sub-matrices in the FFT-based chip equalizer tap solver and the generic RTL schematic. The 4×4 submatrices are partitioned into four mutually exclusive 2×2 submatrices for better adaptation to mobile devices. The 4×4 matrix inverse is then dramatically simplified by exploring the commonality in the partitioned 4×4 inverse. Generic architecture is derived from the special design blocks to eliminate the redundancies in the complex operations. The regulated model facilitates the design of efficient parallel VLSI modules such as "Complex-Hermitian-Multiplication", "Hermitian Inverse" and "Diagonal Transform". This leads to efficient architectures with 3× saving in complexity and more parallel and pipelined RTL schematic, which is verified in FPGA prototyping platform. Possible applications of this method include the downlink CDMA mobile devices that comply with either 1X EV-DV or MIMO-HSDPA standard.

Figure 1:
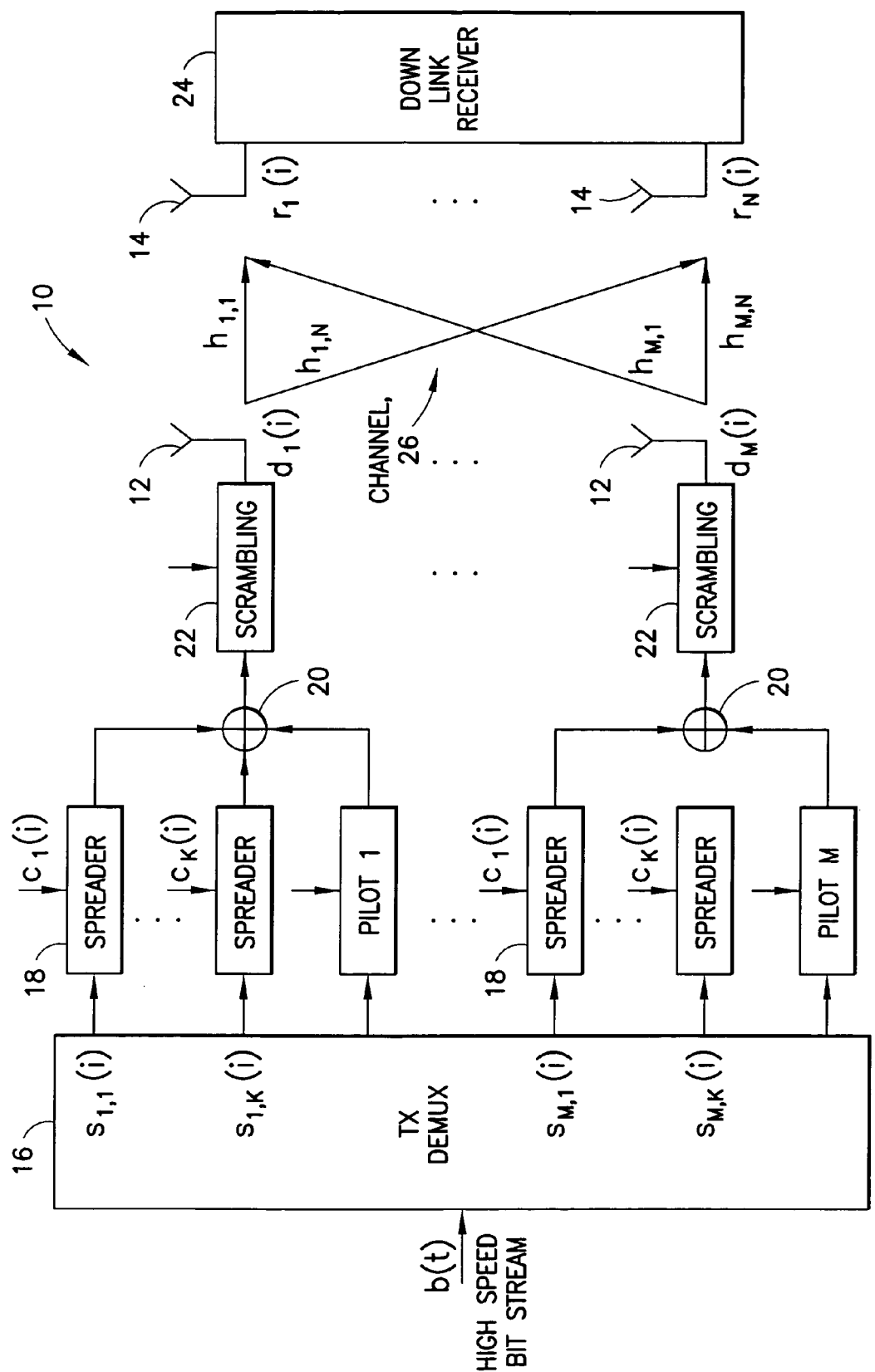
FIG. 1 is a system model of a MIMO Multi-code CDMA downlink.

The MIMO Multi-Code CDMA downlink system 10 using spatial multiplexing is described in FIG. 1. A number M of transmit (Tx) antennas 12 and N receive (Rx) antennas 14 are applied in the system 10, where usually $M \leq N$. In a Multi-Code CDMA system, multiple spreading codes are assigned to a single user to achieve high data rate. First, the high data rate symbols are demultiplexed in a demultiplexor block 16 into K*M lower rate substreams, where K is the number of spreading codes used in the system for data transmission. The substreams are broken into M groups, where each substream in the group is spread in an associated spreader 18 with a spreading code of spreading gain G. The groups of substreams are then combined at summing nodes 20 and scrambled at scramblers 22 with long scrambling codes and transmitted through the $m^{th}$ Tx antenna 12 to the receiver 24 via the channel 26. The chip level signal at the $m^{th}$ transmit antenna is given by, $$d_m(i) = \sum_{k=1}^{K} s_m^k(j) \cdot c_m^k[i] + s_m^P(j) \cdot c_m^P[i], \qquad [1]$$

where j is the symbol index, i is chip index and k is the index of the composite spreading code. $s_m^k[j]$ is the $j^{th}$ symbol of the $k^{th}$ code at the $m^{th}$ substream. In the following, we focus on the $j^{th}$ symbol index and omit the index for simplicity. $c_m^k[i] = c^k[i]c_m^{(s)}[i]$ is the composite spreading code sequence for the $k^{th}$ code at the $m^{th}$ substream where $c^k[i]$ is the user specific Hadamard spreading code and $c_m^{(s)}[i]$ is the antenna specific scrambling long code. $s_m^P[j]$ denotes the pilot symbols at the $m^{th}$ antenna. $c_m^P[i] = c^P[i]c_m^{(s)}[i]$ is the composite spreading code for pilot symbols at the $m^{th}$ antenna. The received chip level signal at the $n^{th}$ Rx antenna is given by $$r_n(i) = \sum_{m=1}^{M_T} \sum_{l=0}^{L_{m,n}} h_{m,n}(l) d_m(i - \tau_1) + z(i), \qquad [2]$$

where the channel is characterized by a channel matrix with elements taken from the channel coefficients between the $m^{th}$ Tx antenna and the $n^{th}$ Rx antenna as $$h_{m,n}(t) = \sum_{l=0}^{L_{m,n}} h_{m,n}(l) \delta(t - \tau_{m,n,l}). \qquad [3]$$

The 'chip' level signal refers to chip samples spread by the spreading code, as opposed to symbol samples. In a spread spectrum system, the chip equalizer acts as a front end (where the samples are spread by the spreading code) to deal with multi-path channel effects. In a typical receiver, a despreader follows the chip equalizer to detect the individual symbols after despreading. By packing the received chips, from all the receive antennas in a vector $\vec{r}(i)=[r_1(i),\ldots r_n(i),\ldots r_N(i)]^T$ and collecting the $L_F=2F+1$ consecutive chips (typically with center at the $i^{th}$ chip from all the N Rx antennas), we form a signal matrix as $\vec{r}_A(i)=[\vec{r}(i+F)^T,\ldots \vec{r}(i)^T,\ldots \vec{r}(i-F)^T]^T$ (where the character $\vec{X}$ over the letter designator such as X is used to represent a matrix). In the vector form, the received signal can be given by, $$\vec{r}_A(i) = \sum_{m=1}^{M} \vec{H}_m \vec{d}_m(i) \quad [4]$$

where $\vec{H}_m$ is a block Toeplitz matrix constructed from the channel coefficients. The multiple receive antennas' channel vector is defined as $\vec{h}(l)=[h_{m,1}(l),\ldots h_{m,n}(l),\ldots h_{m,N}(l)]^T$. The transmitted chip vector for the $m^{th}$ transmit antenna is given by $\vec{d}_M(l)=[d_{m,1}(i+F),\ldots d_{m,n}(i),\ldots d_{m,N}(i-F-L)]^T$. The usage of multiple Tx antennas increases the spectrum efficiency dramatically. The achievable data rate increases almost linearly with the number of Tx antennas. For a fully loaded system (M+K=G), the achievable bit rate is determined by the Tx antenna configuration, the modulation scheme and the chip rate. Table I gives the achievable aggregate uncoded data rate for different number of transmit antennas with a spreading factor (SF) of G=16 and chip rate of 3.84 MHz.

TABLE I

Achievable Uncoded Data Rate (Mbps)

| M | K | QPSK | 16 QAM |
|---|---|------|--------|
| 1 | 15 | 7.2 | 14.4 |
| 2 | 14 | 13.44 | 26.88 |
| 4 | 12 | 23.04 | 46.08 |

Figure 2:
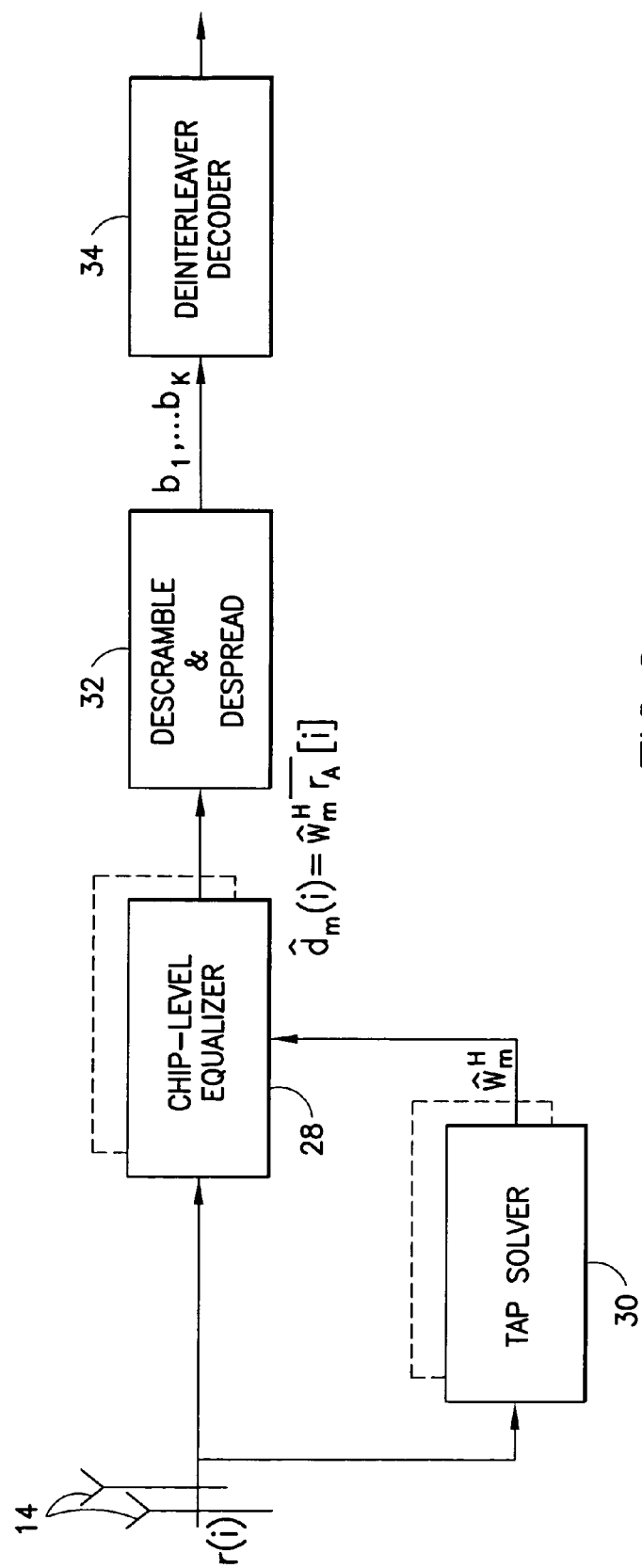
FIG. 2 is a block diagram of LMMSE chip equalizer.

Chip level equalization has been one of the most promising receivers in the single-user CDMA downlink. As shown in FIG. 2, the chip level equalizer 28 in the receiver 24 operates with a tap solver 30, and outputs a chip-level equalized signal to a descrambler/despreader 32 (shown as one functional block but in practice may be broken into two or more) that in turn outputs to a deinterleaver/decoder (also shown in a non-limiting illustration as one functional block). The chip level equalizer 28 estimates the transmitted chip samples by a set of linear FIR filter coefficients as, $$\hat{d}_m(i) = \hat{\vec{w}}_m^H \vec{r}_A[i] \quad [5]$$

Current research consists of two major flavors of equalization, i.e., the non-adaptive linear equalizer and adaptive linear equalizers. Non-adaptive linear equalizers usually assume stationarity of the channel 26 in an observation window and design the equalizer 28 with criteria such as LMMSE or zero forcing. It is well known that the LMMSE solution is given by:

$$\hat{\vec{w}}_m^{opt} = \arg\min E[\|\hat{d}_m(i) - \hat{\vec{w}}_m^H \vec{r}_A[i]\|^2], \quad [6]$$
$$= \sigma_d^2(i) \vec{R}_{rr}(i)^{-1} E[\vec{r}_A[i] \vec{d}_m^H(i)]$$

where the correlation matrix is given by the time-average with ergodicity assumption as $$\vec{R}_{rr} = E[\vec{r}_A[i]\vec{r}_m^H(i)] = \frac{1}{N}\sum_{i=0}^{N-1} \vec{r}_A(i)\vec{r}_A(i) \quad [7]$$

and the channel coefficients are estimated as $\hat{h}_m = E[\vec{r}_A[i]\vec{d}_m^H(i)]$ using the pilot symbols. In the HSDPA standard, about 10% of the total transmit power is dedicated to the Common Pilot Channel (CPICH). This will provide accurate channel estimation.

Using the stationarity of the channel and the convolution property, it is easy to show that the correlation matrix is a banded block Toeplitz matrix, $$\vec{R}_{rr} = \begin{bmatrix} \vec{E}[0] & \cdots & \vec{E}^H[L] & \cdots & 0 \\ \vdots & \ddots & \ddots & \ddots & \vdots \\ E[L] & \ddots & \ddots & \ddots & E^H[L] \\ \vdots & \ddots & \ddots & \ddots & \vdots \\ 0 & \cdots & E[L] & \cdots & E[0] \end{bmatrix}.$$

where $\vec{E}[l]E[l]$ is a N×N block matrix with the correlation coefficients. It is shown that the correlation matrix $\vec{R}_{rr}$ can be approximated by a block-circulant matrix after we add two corner matrices as $$\vec{C}_{rr} = \vec{R}_{rr} + \begin{bmatrix} 0 & 0 & \vec{C}_L^H \\ 0 & \ddots & 0 \\ \vec{C}_L & 0 & 0 \end{bmatrix}, \text{ where } \vec{C}_L = \begin{bmatrix} \vec{E}^H[L] & 0 \\ \vdots & \ddots \\ \vec{E}^H[L] & \vec{E}^H[L] \end{bmatrix}.$$

Using the extension of the diagonalization theorem, the block-circulant matrix can be decomposed as, $$\vec{C}_{rr} = (\vec{D}^H \otimes \vec{I}) \left( \sum_{i=0}^{L_F-1} \vec{W}^i \otimes \vec{E}[i] \right) (\vec{D}^H \otimes \vec{I}), \quad [8]$$

where $\vec{W}=\text{diag}(1, W_{L_F}^{-1}, \ldots, W_{L_F}^{-(L_F-1)})$, and $W_{L_F}=e^{j(2\pi/L_F)}$ is the phase factor coefficient for the DFT computation. The operator $\otimes$ denotes the Kronecker product and $\vec{D}$ is the DFT matrix. For an MIMO system, it can be shown that the MIMO equalizer taps are computed as the following equation, $$\hat{\vec{w}}_m^{opt} \approx (\vec{D}^H \otimes \vec{I}) \cdot \vec{F}^{-1} \cdot (\vec{D} \otimes \vec{I}). \quad [9]$$

$\tilde{F}=\text{diag}(\tilde{F}_0, \tilde{F}_1, \ldots, \tilde{F}_{L_F})$ is a block-diagonal matrix with elements taken from the element-wise FFT of the first column of a circular matrix. For a M×N MIMO system, this reduces the inverse of a (NL$_F$×NL$_F$) matrix to the inverse of sub-block matrices with size N×N.

SYSTEM LEVEL PIPELINING: To achieve real-time implementation, either DSP processors or VLSI architectures could be applied. The limited hardware resource and power supply of mobile device in general makes the hardware design more challenging, especially for the MIMO system. However, the straightforward implementation has many redundancies in computation. Many optimizations are needed to make it suitable for real-time implementation. The interaction between architecture, system partitioning and pipelining are emphasized with the following objectives: 1). Reduced computation complexity; 2). Minimum hardware resource; 3) Parallel and pipelined architecture for the critical computation parts.

To explore the efficient architecture, the tasks are elaborated as follows:

Compute the independent correlation elements [$\vec{E}[0], \ldots, \vec{E}[L]$], and form the first block column of circulant $\vec{C}_{rr}$ by adding the corner elements as $\vec{C}_{rr}^{(l)} = [\vec{E}[0], \ldots, \vec{E}[L], 0, \ldots, 0, \vec{E}^H[L], \ldots, \vec{E}^H[1]]^T$. Each element is an N×N sub block matrix.

Take the element-wise FFT of $\vec{C}_{rr}^{(l)}$ element vectors $$\vec{F}_{n1,n2} = FFT\{\vec{E}_{n1,n2}^{(c)}\},$$

where $$\vec{E}_{n1,n2}^{(c)}[i] = \vec{C}_{rr}^{(l)}[(n_1-i-1)*N+n_2-1], i=[0,L_F],$$
$$n_1, n_2 \in [1,N].$$

For m=[1, M], compute the dimension-wise FFT of the channel estimation as, $$\Phi_m = (\tilde{D} \otimes \tilde{I}) \tilde{h}_m FFT([0, \ldots, 0, h_{m,n}(L), \ldots, h_{m,n}(0), 0, \ldots, 0).$$

n∈[1,N]

Compute the inverse of the N×N sub matrix $\tilde{F}[i]$, where $$\tilde{F}[i]^{-1} = \text{diag}(\tilde{F}[0]^{-1}, \ldots, \tilde{F}[L_F-1]^{-1}).$$

Compute the matrix multiplication of the sub-matrices inverse with the FFT output of channel estimation coefficients $\Psi_m = \tilde{F}^{-1}\Phi_m$.

Compute the dimension-wise IFFT of the matrix multiplication results $\hat{w}_m^{opt} \approx (\tilde{D}^H \otimes \tilde{I}) \Psi_m$.

Figure 3:
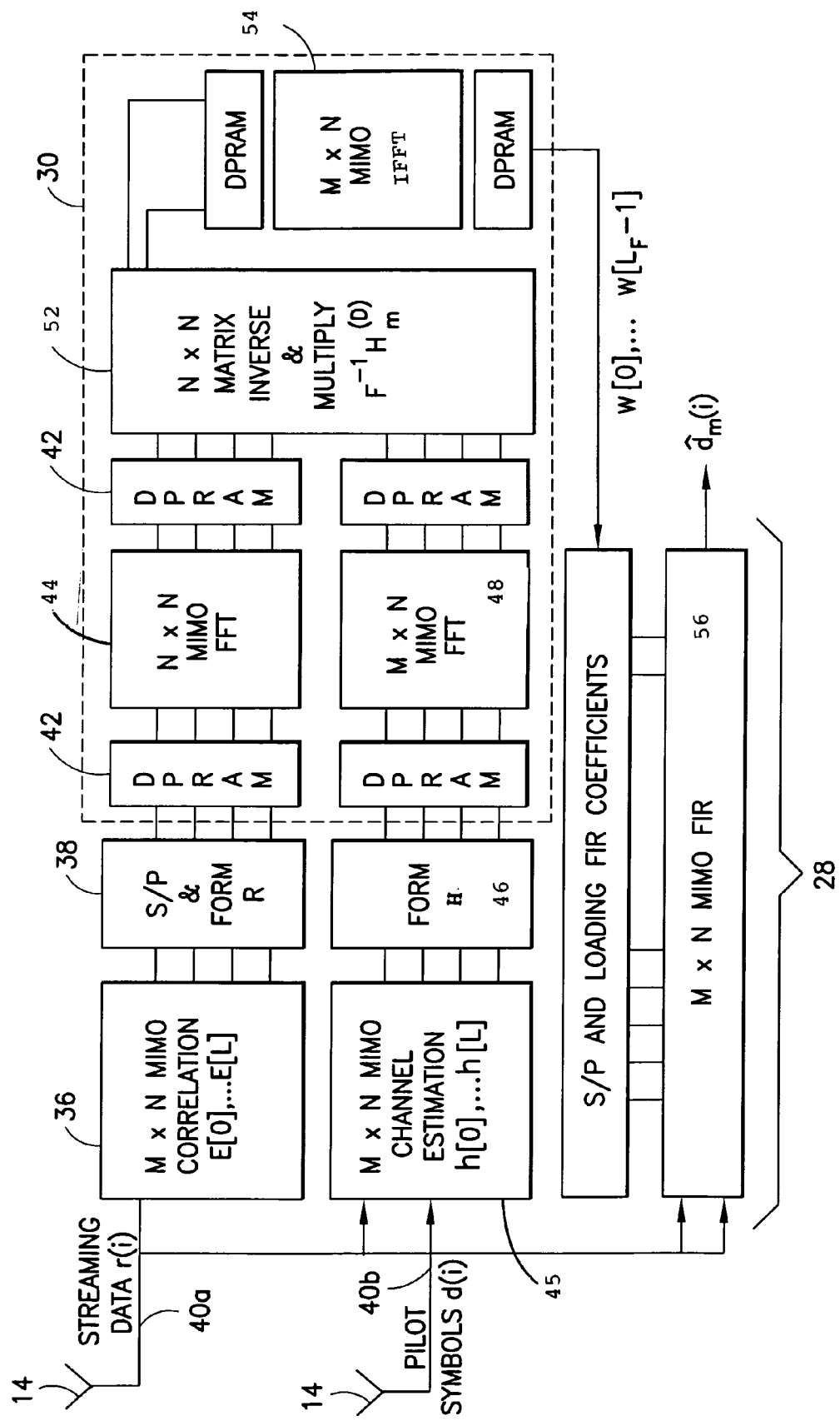
FIG. 3 is a block diagram of the VLSI architecture of the FFT-based MIMO equalizer tap solver.

With a timing and data dependency analysis, the top level design blocks for the MIMO equalizer 28 of the receiver 24 is shown in the block diagram of FIG. 3, which further shows the tap solver 30 within the dashed line block. The system-level pipeline is designed for better modularity. A correlation estimation block 36 takes, on one data path 40a, the multiple input samples from the receive antennas 14 for each chip to compute the correlation coefficients of the first column of $\tilde{R}_{rr}$. It is made circulant by adding corner to form the matrix [$\vec{E}[0], \vec{E}[1], \ldots, \vec{E}[L], 0, \ldots, 0, \vec{E}[L]^H, \ldots, \vec{E}[1]^H$] at a $\tilde{R}_{rr}$ matrix estimation block 38. The complete coefficients are written to DPRAMs 42 (storage media) and the N×N element-wise FFT module 44 computes [$\vec{F}[0], \ldots, \vec{F}[L_F]$]=FFT{[$\vec{E}[0], \ldots, \vec{E}[L], 0, \ldots 0, \vec{E}[L]^H, \ldots, \vec{E}[1]^H$]}.

Another parallel data path 40b is for the channel estimation and the M×N dimension-wise FFTs on the channel coefficient vectors as in $(\tilde{D} \otimes \tilde{I}) \tilde{h}_m$. The pilot symbols from the parallel data path 40b are used to estimate the channel at a channel estimation block 45. These are assembled in a channel matrix block 46 into a matrix that estimates the full channel, of which a FFT is taken at another FFT module 48. A sub-matrix inverse and multiplication block 52 takes the FFT coefficients of both channels and correlations from DPRAMs 42 and carries out the computation as in $\tilde{F}^{-1}(\tilde{D} \otimes \tilde{I}) \tilde{h}_m$.

Finally, a M×N dimension-wise IFFT module 54 generates the results for the equalizer taps $\tilde{W}$ and sends them to the M×N MIMO FIR block 56 for filtering. To reflect the correct timing, the correlation 36 and channel estimation 45 modules at the front-end will work in a throughput mode on the streaming input samples. The FFT/IFFT modules (44, 48, 54) in the dotted line block construct the post-processing of the tap solver 30. They are suitable to work in a block mode using dual-point RAM blocks to communicate the data. The MIMO FIR filtering 56 will also work in throughput mode on the buffered streaming input data.

HERMITIAN OPTIMIZATION & REDUCED-STATE FFT: From the circulant feature of the correlation matrix, the complexity of the FFT computation can be reduced with the following Lemma. Define the element-wise FFT of the correlation matrix as $$\{\vec{E}[1]\} \stackrel{FFT}{\Longrightarrow} [\vec{F}_{i,j}[1:L_F]]_{N \times N}.$$

For both the SIMO and MIMO cases, the element-wise FFT result of the circulant correlation coefficients vectors admit Hermitian structure by using the features of FFT computation. The Hermitian feature is given by the following Lemma.

Lemma 1: $\vec{F}_{i,j} = \text{conj}(\vec{F}_{i,j})$. Thus the computation of $\vec{F}_{j,i}$ is redundant for j<i.

Lemma 2: Because the imaginary part of $\vec{F}_{i,i}$ equals to 0, the computation of $\vec{F}_{i,i}$ can be reduced to only L/L$_F$ of the full DFT. The computations related to $\vec{F}_{i,i}$ also reduce to real computation, saving 50% of complexity. Because the FFT algorithm applies the features of the rotation coefficients, the application of the Hermitian feature in Lemma 2 is not straightforward. Hardware-oriented optimization for the Reduced-State FFT (RS-FFT) can be derived with pruning operations bases on the standard Decimation-In-Time (DIT) FFT algorithm. The different type of butterfly units are differentiated based on the features of the output coefficients, and unnecessary computation branches are pruned in the butterfly tree. Notice that in the standard butterfly unit, each operation involves a full complex multiplication, which has four real multiplications and two real additions. Pruning increases efficiency in the reduced-state FFT architectures. Although the saving diminishes when the number of FFTs increases to a very large number, for the equalizer application, the length of FFT remains in the range of 64-point FFT. The RS-FFT saves roughly 50% of the real multiplication. Certain aspects of this invention utilize the Hermitian feature and focus on the optimization of the matrix inverse and multiplication module following the element-wise FFT modules in the block tap solver.

HERMITIAN MATRIX INVERSE ARCHITECTURES: Although the FFT-based tap solver avoids the direct matrix inverse of the original correlation matrix with the dimension of NF×NF, the inverse of the diagonal matrix $\tilde{F}$ is inevitable. For a MIMO receiver with high receive dimension, the matrix inverse and multiplication in $\tilde{F}^{-1}(\tilde{D} \otimes \tilde{I}) \tilde{h}_m$ is not trivial. Because of the diagonal feature of $\tilde{F}$ matrix, it can be divided into the inverse of L$_F$ sub-matrices of size N×N as in $\tilde{F}^{-1} = \text{diag}(\tilde{F}_0^{-1}, \tilde{F}_1^{-1}, \ldots, \tilde{F}_{L_F-1}^{-1})$. A traditional N×N matrix inverse using Gaussian elimination has the complexity at $O(N^3)$ complex operations. From the Hermitian lemma above, it is clear that the elements of $\vec{F}$ are also Hermitian symmetric. There is a Lemma on the Hermitian eigen value decomposition: if $\vec{A} \in \mathcal{C}^{n \times n}$ is such that $\vec{A}=\vec{A}^H$, there exist a unitary matrix $\vec{U} \in \mathcal{C}^{n \times n}$, such that $\vec{U}^H \vec{A} \vec{U} = \vec{\Lambda}$, where $\vec{\Lambda} \in \mathcal{R}^{n \times n}$ is a diagonal matrix of the eigen values of $\vec{A}$. Cholesky decomposition can be applied to facilitate the inverse of these matrices. However, this method requires arithmetic square root operations that are preferable to be avoided in hardware due to their complexity. The following detailed description considers two special cases individually, i.e., two and four Rx antennas, as these are most likely to be widely adopted. Adaptation of these teachings to different numbers of Rx antennas follows logically. Shown are complexity reduction schemes and efficient architectures suitable for VLSI (very large scale) implementation based on the exploration of block partitioning. The commonality of the partitioned block matrix inverse is extracted to design generic RTL modules for reusable modularity. The 4×4 receiver is designed by reusing the 2×2 block partitioning.

DUAL-ANTENNA MIMO/ST RECEIVER: From equation [9], a straightforward partitioning is at the matrix inversion for $\vec{F}$ and then the matrix multiplication of $\vec{F}^{-1}$ and dimension-wise FFT of the channel coefficients. In this partitioning, the inverse of the entire sub-block matrix in $\vec{F}$ is first computed, followed by a matrix multiplication. However, this partitioning involves two separate loop structures. Since the two steps have same loop structure, it is more desirable to merge the two steps and reduce the overhead. The inverse of a 2×2 submatrix is given by, $$\vec{F}^{-1} = \begin{bmatrix} f_{0,0}(k) & f_{0,1}(k) \\ f_{1,0}(k) & f_{1,1}(k) \end{bmatrix}^{-1} = \quad [10]$$
$$\frac{1}{f_{0,0}(k) * f_{1,1}(k) - f_{0,1}(k) * f_{1,0}(k)} \begin{bmatrix} f_{1,1}(k) & -f_{0,1}(k) \\ -f_{1,0}(k) & f_{0,0}(k) \end{bmatrix}.$$

Let $\vec{\Gamma}=(\vec{D} \otimes \vec{I})\vec{h}=[\vec{\Gamma}_0 \vec{\Gamma}_1 \ldots \vec{\Gamma}_{L_F-1}]$, where $\vec{\Gamma}_k=[\gamma_1(k)\gamma_2(k)]$ is the combination of the $k^{th}$ elements of the dimension-wise FFT coefficients, then a merged computation of the matrix inverse and multiplication is given by $$\vec{G} = \vec{F}^{-1} \cdot (\vec{D} \otimes \vec{I})\vec{h} \quad [11]$$
$$= diag(\vec{F}_0^{-1}, \vec{F}_1^{-1}, \ldots, \vec{F}_{L_F-1}^{-1})\vec{\Gamma}$$
$$= [\vec{F}_0^{-1}\vec{\Gamma}_0^T, \vec{F}_1^{-1}\vec{\Gamma}_1^T, \ldots, \vec{F}_{L_F-1}^{-1}\vec{\Gamma}_{L_F-1}^T]^T$$

Thus a single merged loop can be used to compute the final result of $\vec{G}$ instead of using separate loops. However, with the Hermitian features of $\vec{F}_{0,0}$, $\vec{F}_{1,1}$, we can reduce the number of real operations in the matrix inversion and multiplication module. This is a direct result from the features in Lemma 1 and Lemma 2 with differentiation of the real, half complex and complex multiplication/addition. It leads to a simplified equation for the $k^{th}$ element of the matrix G as shown, $$\vec{W}(k) = \frac{1}{f_{0,0}(k) \cdot f_{1,1}(k) - |f_{0,1}(k)|^2} \begin{bmatrix} f_{1,1}(k) \circ \gamma_1(k) - f_{0,1}(k) * \gamma_2(k) \\ f_{0,0}(k) \circ \gamma_2(k) - f_{0,1}(k)^* * \gamma_1(k) \end{bmatrix} \quad [12]$$

where "a·b" means "real×real"; "a∘b" means "real×complex" and "a*b" means "complex×complex" multiplications. The complex division is replaced by a real division. From this, we derived the simplified data path with the Hermitian optimization as in FIG. 4. In this figure, $f_{0,0}(k)$ and $f_{1,1}(k)$ are real numbers. The single multiplier means a real multiplication. The multiplier with a circle means the "real×complex" multiplication and the multiplier with a rectangle is a "complex×complex" multiplication.

Figure 4:
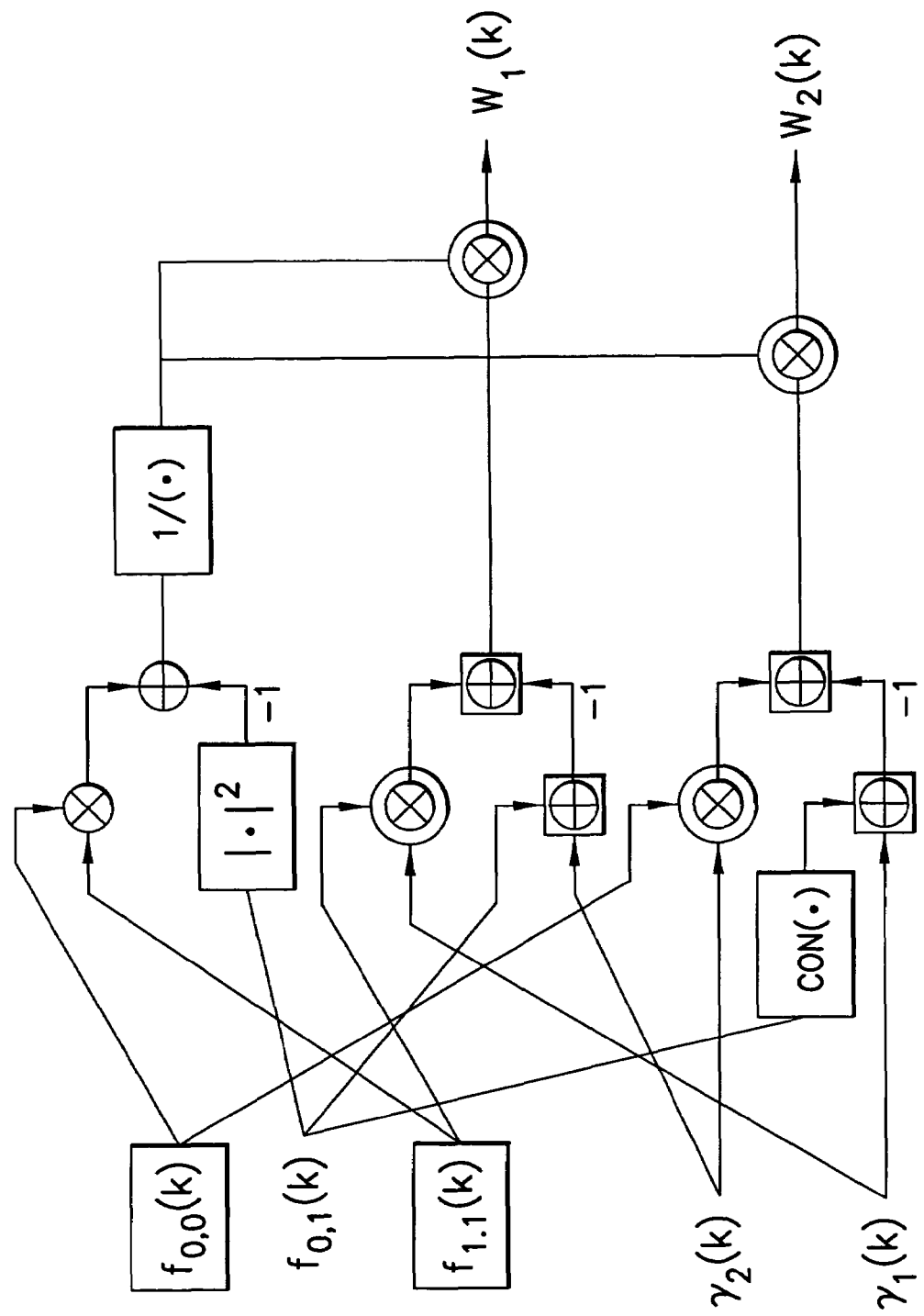
FIG. 4 is a Hermitian optimized data path of merged 2×2 matrix inverse and channel multiplication.

From FIG. 4, it is clear that the data path is significantly simplified as compared to the prior art full DMI. This facilitates the scaling in fixed point implementation and thus increases the stability of the algorithm. The complexity is compared as follows. The original matrix inverse and multiplication based on all complex numbers has 10 complex+2 real multiplications. This is equal to 42 real multiplications for one loop. For a block with FFT length of 32, there will be 42*32=1344 real multiplications. In the simplified data path, there are 2 complex+5 half complex+1 real multiplications. This is equal to 19 real multiplications in each loop, or 608 real multiplications in one block. Notice that the storage for the interface from element-wise FFTs is also reduced. We save four distribute DPRAMs for $Im(f_{0,0})$, $Im(f_{1,1})$, $Re(f_{0,0})$, and $Re(f_{1,1})$.

RECEIVER WITH 4 Rx ANTENNAS: This includes the 1×4, 2×4, 4×4 SIMO and MIMO scenarios. Note that the receiver diversity by over sampling also has the same mathematic format. So this may also be the case of 2 receive antennas with over sampling factor of 2. The principle operation of interest is the inverse of the 4×4 matrices (which are present for N=2 and oversampling factor of two), so it is necessary to determine which range of possible matrix architectures is most suitable to this application. In addition to minimizing the circuit area used, the design needs to work within a short time budget. An efficient computing architecture for this part saves the area and time resources. To start, partition the 4×4 sub matrices in $\vec{F}[i]$ into four 2×2 block sub matrices as, $$\vec{F}[i]_{4 \times 4} = \begin{bmatrix} f_{11}[i] & f_{12}[i] & f_{13}[i] & f_{14}[i] \\ f_{21}[i] & f_{22}[i] & f_{23}[i] & f_{24}[i] \\ f_{31}[i] & f_{32}[i] & f_{33}[i] & f_{34}[i] \\ f_{41}[i] & f_{42}[i] & f_{43}[i] & f_{44}[i] \end{bmatrix} = \begin{bmatrix} \vec{B}_{11}[i] & \vec{B}_{12}[i] \\ \vec{B}_{21}[i] & \vec{B}_{22}[i] \end{bmatrix}_k \quad [13]$$

The inverse of the 4×4 matrix can be carried out by sequential inverse of four 2×2 sub-matrices. For simplicity, we partition the 4×4 element matrix inverse as $$\vec{F}[i]^{-1} = \begin{bmatrix} \vec{C}_{11}[i] & \vec{C}_{12}[i] \\ \vec{C}_{21}[i] & \vec{C}_{22}[i] \end{bmatrix}.$$

It can be shown that the sub-blocks are given by the following equations:

$$\begin{cases} \vec{C}_{22}[i] = (\vec{B}_{22}[i] - \vec{B}_{21}[i]\vec{B}_{11}[i]^{-1}\vec{B}_{12}[i])^{-1} \\ \vec{C}_{12}[i] = -\vec{B}_{11}[i]^{-1}\vec{B}_{12}[i]\vec{C}_{22}[i] \\ \vec{C}_{21}[i] = -\vec{C}_{22}[i]\vec{B}_{21}[i]\vec{B}_{11}[i]^{-1} \\ \vec{C}_{11}[i] = \vec{B}_{11}[i]^{-1} - \vec{C}_{12}[i]\vec{B}_{21}[i]\vec{B}_{11}[i]^{-1} \end{cases} \quad [14]$$

Without looking into the data dependency, a straightforward computation will have eight complex matrix multiplications, two complex matrix inverses and two complex matrix subtractions, all of the size 2×2. But this is not very efficient. Examining the data dependency reveals some duplicate operations in the data path. For a general case without considering the Hermitian structure of the $\vec{F}[i]$ matrix, it can be shown that a sequential computation has the dependency path of the data flow given by FIG. 5(a). The raw complexity is given by: six matrix multiplies, two inverses and two subtractions. From the data path flow, the critical path can be identified.

Now the Hermitian feature of the $\vec{F}$ matrix are utilized to derive more parallel and optimized computing architecture. Since the inverse of a Hermitian matrix is Hermitian, i.e., $\vec{F}^{-1}=[\vec{F}^{-1}]^H$, it can be shown that, $$\vec{B}_{11}^{-1}[i] = [\vec{B}_{11}^{-1}]^H \qquad \vec{C}_{11}^{-1}[i] = [\vec{C}_{11}^{-1}]^H$$
$$\vec{B}_{12}^{-1}[i] = [\vec{B}_{21}^{-1}]^H \Rightarrow \vec{C}_{12}^{-1}[i] = [\vec{C}_{21}^{-1}]^H.$$
$$\vec{B}_{22}^{-1}[i] = [\vec{B}_{22}^{-1}]^H \qquad \vec{C}_{22}^{-1}[i] = [\vec{C}_{22}^{-1}]^H$$

This leads to the data path by removing the duplicate computation blocks that has the Hermitian relationship. The reduced data path is shown in FIG. 5(b), where HINV means the inverse of a 2×2 Hermitian matrix and $[\ ]^H$ is the Hermitian operation of a 2×2 matrix. This data path might be termed a straightforward Hermitian optimization architecture of the partitioned 4×4 matrix inverse.

However, this straightforward treatment still does not lead to the most efficient computing architecture. The data path is still constructed with a very long dependency path. To fully extract the commonality and regulate the design blocks in VLSI, we define the following special operators on the 2×2 matrices for the different type of complex number computations. These special operators will be mapped to VLSI Processing Units (PU) to deal with the special features of the Hermitian matrix. High-level modularity is achieved by extracting the commonality among the data path.

Definition 1: "pPow(a b)=Re(a).Re(b)+Im(a).Im(b)" is defined as the pseudo-power function of two complex numbers and "Re(a,b)=Re(a).Re(b)−Im(a).Im(b)" is defined as the real part of a complex multiplication.

Definition 2: For a general 2×2 matrix $\vec{A}$ and a Hermitian 2×2 matrix $\vec{B}=\vec{B}^H$, we define the operator CHM (Complex-Hermitian-Multiplication) as $$M(\vec{A}, \vec{B}) = \vec{A}\vec{B} = \begin{bmatrix} a_{11} & a_{12} \\ a_{21} & a_{22} \end{bmatrix}\begin{bmatrix} b_{11} & b_{21}^* \\ b_{21} & b_{22} \end{bmatrix}.$$

Note that all the numbers are complex except $\{b_{11},b_{22}\}\in \mathfrak{R}$.

Definition 3: For a 2×2 Hermitian matrix $$\vec{B} = \begin{bmatrix} b_{11} & b_{21}^* \\ b_{21} & b_{22} \end{bmatrix} = \vec{B}^H,$$

define the Hermitian Inverse (HInv) operator as $$HInv(\vec{B}) = \frac{1}{(b_{11}b_{22} - |b_{21}|^2)}\begin{bmatrix} b_{22} & -b_{21}^* \\ -b_{21} & b_{11} \end{bmatrix}.$$

This design can be achieved by simple real multiplications and divisions instead of complex multiplications and divisions.

Definition 4: Given the 4×4 Hermitian $\vec{A}$ which is divided into four subblocks as $$\vec{A} = \begin{bmatrix} \vec{A}_{11} & \vec{A}_{21}^* \\ \vec{A}_{21} & \vec{A}_{22} \end{bmatrix} = \vec{A}^H,$$

the DT (Diagonal Transform) of $\vec{A}$ is defined as, $$T(\vec{A}) = T(\vec{A}_{11}, \vec{A}_{21}, \vec{A}_{22}) \qquad [15]$$
$$= \vec{A}_{22} - \vec{A}_{21}\vec{A}_{11}\vec{A}_{21}^H$$
$$= \vec{A}_{22} - M(\vec{A}_{21}, \vec{A}_{11})\vec{A}_{21}^H$$

With these definitions, we regulate the inverse of the 4×4 Hermitian matrix $\vec{F}=\vec{F}^H$ into simplified operations on 2×2 matrices. After some manipulation, the partitioned subblock computation equations can be mapped to the following procedure using the defined operators.

$$\vec{B}_{inv}=HInv(\vec{B}_{11})=\vec{B}_{inv}^H; \qquad (1):$$

$$\vec{D}=M(\vec{B}_{21},\vec{B}_{inv}); \qquad (2):$$

$$\vec{C}_{22}=HInv(T(\vec{B}_{inv},\vec{B}_{21},\vec{B}_{22})); \qquad (3):$$

$$\vec{C}_{12}=-M(\vec{D}^H,\vec{C}_{22}); \text{ because } \vec{C}_{12}=\vec{C}_{21}^H=-(\vec{C}_{22}\vec{D})^H=-\vec{D}^H\vec{C}_{22} \qquad (4):$$

$$\vec{C}_{11}[i]=\vec{B}_{inv}+\vec{D}^H\vec{C}_{22}\vec{D}=_T(-\vec{C}_{22},\vec{D}^H,\vec{B}_{inv}) \qquad (5):$$

Figure 6:
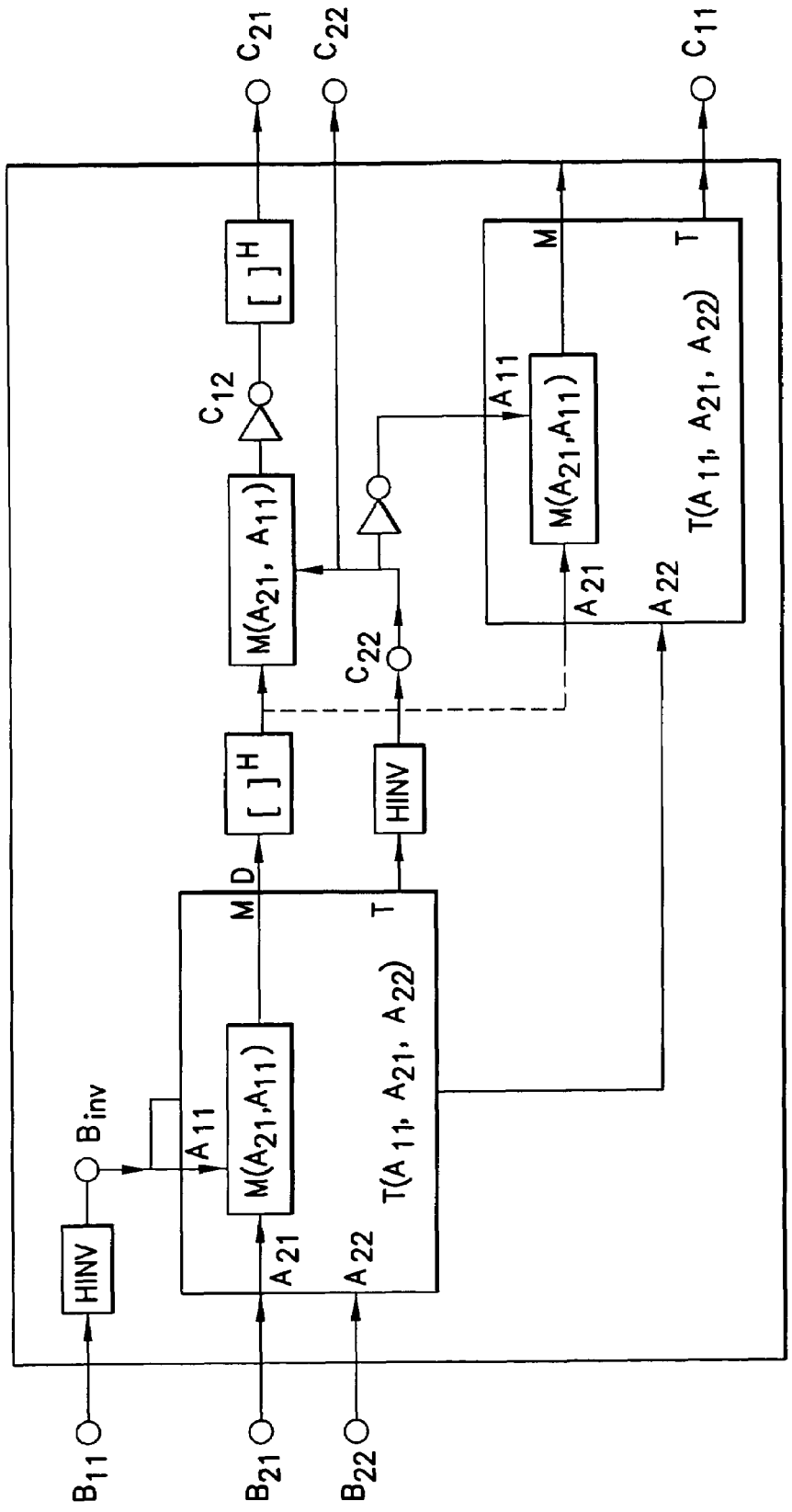
FIG. 6 is a VLSI design architecture using generic design modules T, M and HINV.

This leads to the hardware mapping using the generic Processing Units in FIG. 6, which reveals that the overall computation complexity is 2HInv operations, 2 DTs, and 1 extra CHM block. Because the sign inverter and the Hermitian formatter $[\ ]^H$ has no hardware resource at all, the computation complexity is determined by the three generic blocks. The data path of the computation shows the timing relationship between different design modules. This regulated block diagram facilitates the design of efficient parallel VLSI modules; whose details are given in the following.

PARALLEL ARCHITECTURE MODULES: Now we derive the efficient design modules for the generic $\vec{M}$ and $\vec{T}$ operations. To extract the commonality and reduce the redundancy, we need to explore the timing relationship of the basic computations involved in generic operations. Because the operation $\vec{M}$ is also embedded in the $\vec{T}$ transform, we need to design the interface in a way that the duplicate computations are removed and the efficient computing architecture is reused. The grouping of computations and the smart usage of interim registers will eliminate the redundancy and give simple and generic interface to the design modules. For a single $\vec{M}(\vec{A}, \vec{B})$ module, let $$\vec{D} = \begin{bmatrix} d_{11} & d_{12} \\ d_{21} & d_{22} \end{bmatrix}$$

$$= M(\vec{A}, \vec{B})$$

$$= \begin{bmatrix} a_{11} \circ b_{11} + a_{11} * b_{12} & a_{11} * b_{21}^* + a_{12} \circ b_{22} \\ a_{21} \circ b_{11} + a_{22} * b_{21} & a_{21} * b_{21}^* + a_{22} \circ b_{22} \end{bmatrix}.$$

To extract the commonality in the $\vec{M}$ and $\vec{T}$ operations, we have the following lemma for Hermitian matrix. Lemma: If $\vec{B} = \vec{B}^H$ is a 2×2 Hermitian Matrix, then $\vec{A}\vec{B}\vec{A}^H$ is also a Hermitian matrix. The associated computation is given by 6 CMs (complex multiplications), 4 CRMs (complex-real multiplications), 4 pPow(a b) and 2 Re(a,b), where the 6 CMs are $\{a_{12}*b_{21}, a_{11}*b_{21}^*, a_{22}*b_{21}, a_{21}*b_{21}^*, d_{21}*a_{11}^*, d_{22}*a_{12}^*\}$, the 4 "CRM" operations are $\{\text{tmp1}=(a_{11}\circ b_{11}), \text{tmp3}=(a_{12}\circ b_{22}), \text{tmp5}=(a_{21}\circ b_{11}), \text{tmp7}=(a_{22}\circ b_{22})\}$, and the 4 "pPow" operations are pPow(tmp1,$a_{11}^*$), pPow(tmp3,$a_{12}^*$), pPow(tmp5,$a_{21}^*$), pPow(tmp7,$a_{22}^*$) The two Re(a,b) operations are Re(tmp2,$a_{11}^*$), Re(tmp6,$a_{21}^*$).

Proof: Extend and group the computation of $\vec{G} = \vec{A}\vec{B}\vec{A}^H$ as follows, $$\vec{G} = \begin{bmatrix} g_{11} & g_{12} \\ g_{21} & g_{22} \end{bmatrix}$$

$$= \vec{A}\vec{B}\vec{A}^H$$

$$= M(\vec{A}, \vec{B})\vec{A}^H$$

$$= \begin{bmatrix} a_{11} \circ b_{11} + a_{11} * b_{12} & a_{11} * b_{21}^* + a_{12} \circ b_{22} \\ a_{21} \circ b_{11} + a_{22} * b_{21} & a_{21} * b_{21}^* + a_{22} \circ b_{22} \end{bmatrix} \begin{bmatrix} a_{11}^* & a_{21}^* \\ a_{12}^* & a_{22}^* \end{bmatrix}$$

which yields elements:

$g_{11} = (a_{11} \circ b_{11})*a_{11}* + [a_{12}*b_{21}*a_{11}* + a_{11}*b_{21}**a_{12}*] + (a_{12} \circ b_{22})*a_{12}*$;

$g_{21} = d_{21}*a_{11}* + d_{22}*a_{12}*$;

$g_{12} = d_{21}*a_{11}* + d_{22}*a_{12}$;

$g_{22} = (a_{21} \circ b_{11})*a_{21}* + [a_{22}*b_{21}*a_{21}* + a_{21}*b_{21}**a_{22}*] + (a_{22} \circ b_{22})*a_{22}*$ In the equation, a*b denotes a "complex×complex" multiplication, and a∘b denotes a "complex×real" multiplication. Define the interim registers $\text{tmp1}=(a_{11}\circ b_{11})$, $\text{tmp2}=(a_{12}*b_{21})$, $\text{tmp3}=(a_{12}\circ b_{22})$, $\text{tmp5}=(a_{21}\circ b_{11})$, $\text{tmp6}=a_{22}*b_{21}$, $\text{tmp7}=(a_{22}\circ b_{22})$ These interim values are added to generate $d_{11}, d_{12}, d_{21}, d_{22}$. However, instead of having a general complex multiplication of these interim values with the inputs to generate the final results, we can employ the relationship of these variables and use the special functional components. For example, it is easy to verify that $(a_{11}\circ b_{11})*a_{11}*=\text{pPow}(\text{tmp1}, a_{11})$ because the $b_{11}$ is a scalar of the norm of $a_{11}$. By changing the order of computation and combining common computations, we can finally show that $\vec{G}$ is a Hermitian matrix with the elements given by, $$\begin{cases} g_{11} = pPow(tmp1, a_{11}^*) + 2\text{Re}(tmp2, a_{11}^*) + pPow(tmp3, a_{12}^*) \\ g_{21} = d_{21}*a_{11}^* + d_{22}*a_{12}^* \\ g_{12} = g_{21}^* \\ g_{22} = pPow(tmp5, a_{21}^*) + 2\text{Re}(tmp6, a_{21}^*) + pPow(tmp7, a_{22}^*) \end{cases}$$

Figure 7:
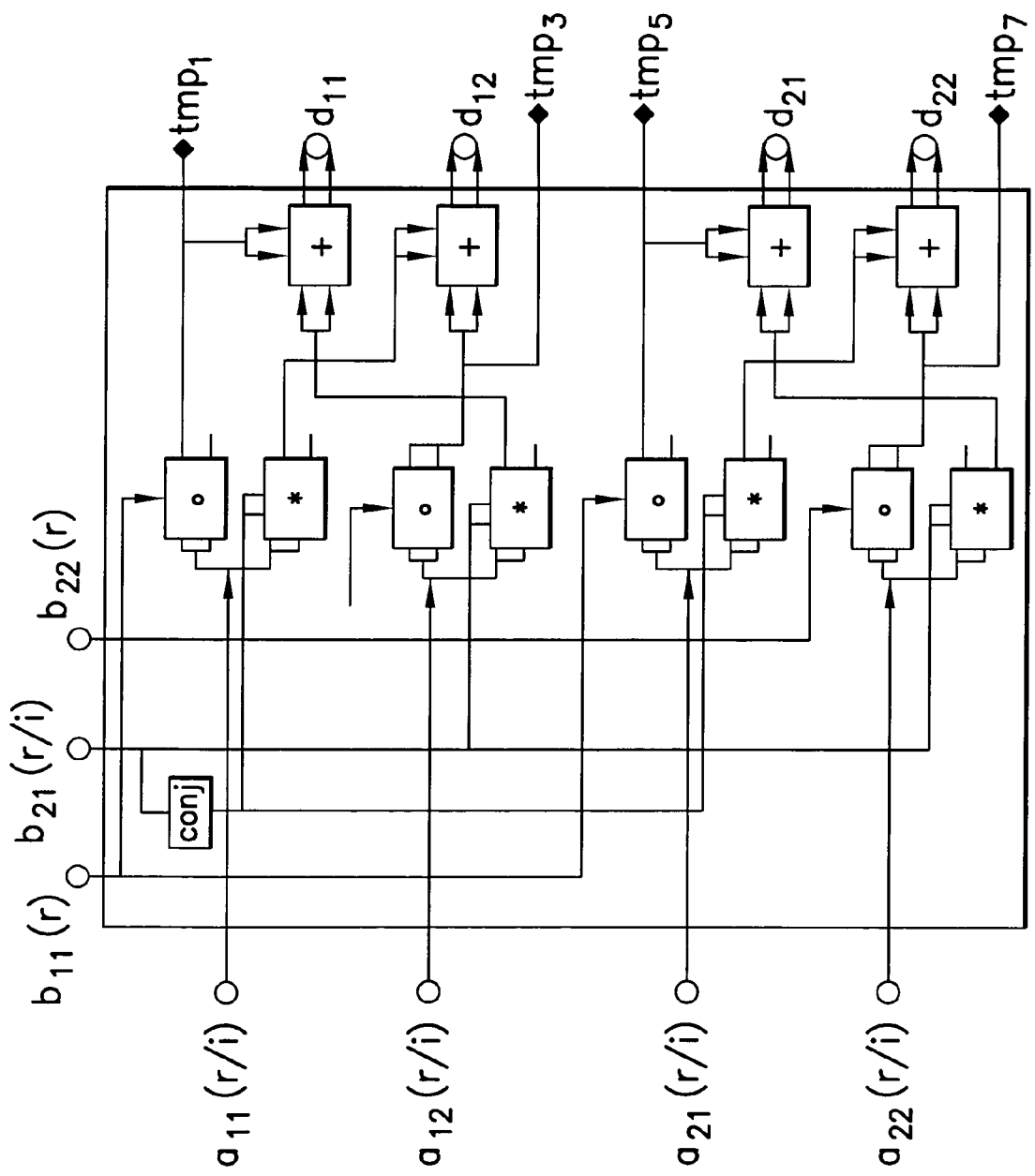
FIG. 7 is a parallel VLSI RTL architecture layout of the M(A,B) processing unit.
Figure 8:
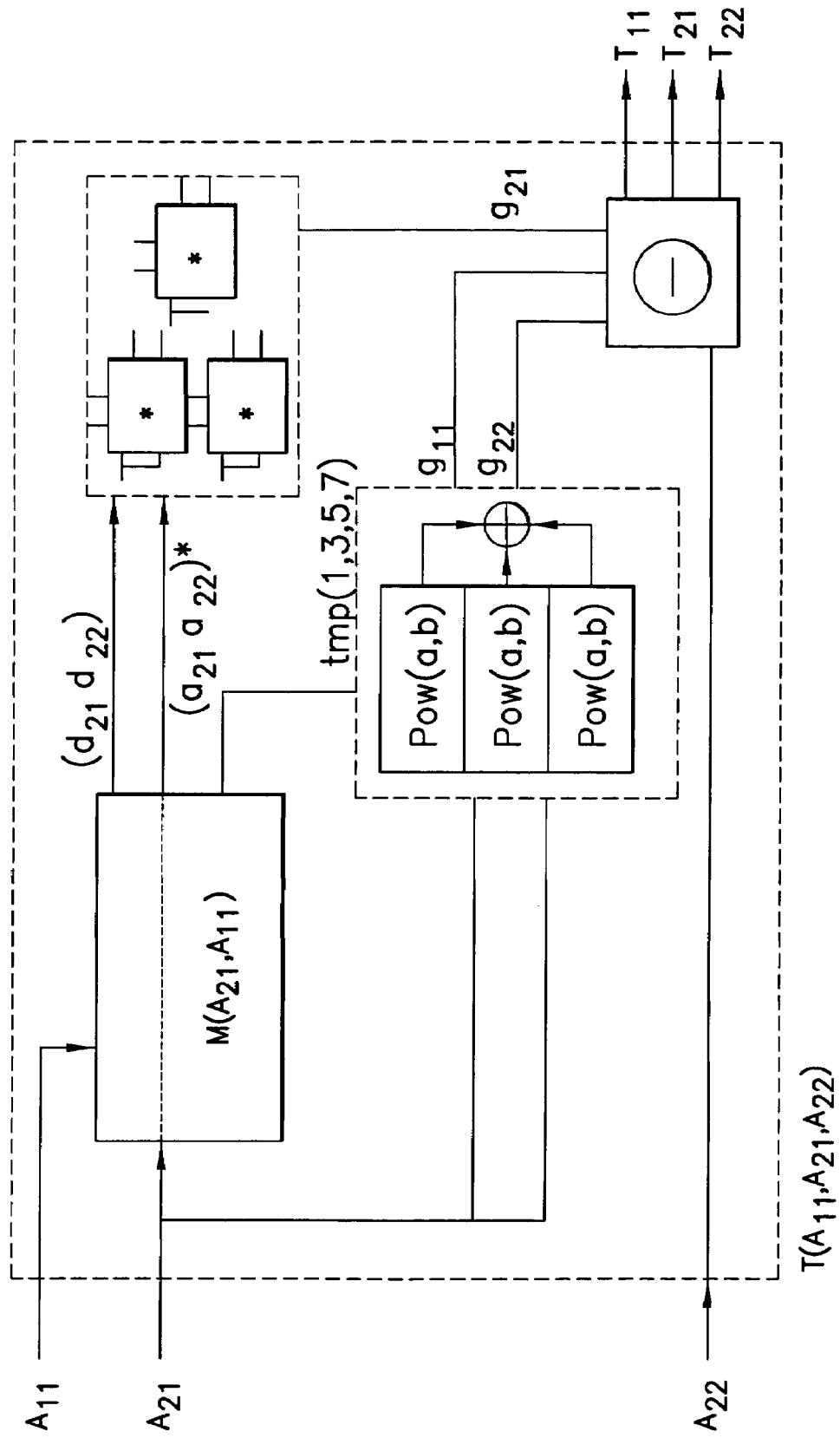
FIG. 8 is a RTL architecture layout of the $T(A_{11}, A_{21}, A_{22})$ design block.

Thus the simplified $M(\vec{A}, \vec{B})$ RTL module can be design as FIG. 7, with the input of both real and imaginary parts of $\vec{A}\{a_{11}(r/i), a_{12}(r/i), a_{21}(r/i), a_{22}(r/i)\}$ and only the necessary elements of the Hermitian matrix $\vec{B}$ as in $\{b_{11}(r), b_{21}(r/i), b_{22}(r)\}$. The output ports include $\{\text{tmp1, tmp2, tmp3, tmp5, tmp6, tmp7}\}$. There is no need to output tmp4 and tmp8. Moreover, although all these numbers have complex values, the products with the input values do not need to be complex multiplications. We also only need to compute $d_{21}, d_{22}$ to get the $\vec{G}$ elements. The redundant computations in $\{\text{tmp4, tmp8}, d_{21}, d_{22}\}$ are eliminated from the $M(\vec{A}, \vec{B})$ operation. Built from the simplified $M(\vec{A}, \vec{B})$ module, the data path RTL module of the $T(\vec{A}_{11}, \vec{A}_{21}, \vec{A}_{22})$ transform of the 4×4 Hermitian matrix is given by FIG. 8, with the simplified Functional Components $\{pPow(a,b), Re(a,b)\}$ as defined. The output ports of the $T(\vec{A}_{11}, \vec{A}_{21}, \vec{A}_{22})$ include the independent elements $\{t_{11}, t_{21}, t_{22}\}$.

PERFORMANCE AND DESIGN: From the simplified generic design modules, the top level RTL schematic is designed as in FIG. 6. Compared with both the designs in FIG. 4 and FIG. 5, the architectures demonstrate better parallelism and reduced redundancy. Because the commonality of the $\vec{M}$ and $\vec{T}$ is extracted in the module designs, the RTL in the top level may be further optimized as shown in the following by eliminate the individual $\vec{M}$ module. Thus, the results of $\vec{C}_{11}$, $\vec{C}_{12}$ and $\vec{C}_2$, are generated from the second $\vec{T}$ module together. This design not only eliminates the redundancy to the best extent, but also facilitates the pipelining for multiple subcarriers. The data path is much better balanced to achieve a high-speed VLSI architecture.

The number of real multiplications may be further reduced by changing the numerical computation order of the complex multiplications in the $\vec{M}$ module. Traditionally, a complex multiplication is given by "$c=c_r+jc_i=(a_r+ja_i)*(b_r+jb_i)=(a_rb_r-a_ib_i)+j(a_rb_i+a_ib_r)$". This has four independent real multiplications and two real additions. By rearranging the computation order, we can extract the commonality and reduce the number of real multiplications as following:

$p_1=a_rb_r; p_2=a_ib_i; s_1=a_r+a_i; s_2=b_r+b_i;$ (1)

$c_rp_1-p_2; d=(p_1+p_2); s=s_1s_2;$ (2)

$c_i=s-d.$ (3)

This requires three RMs (real multiplications) and two RAs (real additions) in three steps. Considering the fact that RA is much cheaper than RM, the cost is worthwhile.

The number of RMs and RAs is summarized by utilizing the Hermitian feature of the matrix elements to reduce the redundant computation. The metrics of different fundamental computations are listed in Table II as a reference. It is clear that the inverse of a 2×2 Hermitian matrix requires seven RM and two RA, while the direct inverse of a general 2×2 matrix requires twenty-six RMs. The complex 2×2 matrix multiplication needs thirty-two RMs. If we use a traditional computing architecture of the 4×4 matrix inverse, we need 8*8*4+2*6.5*4=308 RMs and 8*8*4+2*1.5*2+2*4*2=150 RAs without utilizing the data dependency optimization (DO). Even with a straightforward data dependency optimization, the complexity is still 244 RMs and 102 RAs. However, a single $\tilde{F}$ transform needs a total of 6*3+4*2+4*2+2*2=38 RMs for a 4×4 Hermitian matrix. All together, the number of real multiplications is 2×(38+7)=90 RMs to compute the 4×4 $\tilde{F}^{-1}$ with Hermitian structure. This is only less than one-third of the real multiplications for a traditional architecture to compute the inverse. Note that the critical data path is also dramatically shortened with better modularity and pipelining. The complexity reduction in terms of real multiplications is shown in Table III.

TABLE II

Number of RMs and RAs for Fundamental Operations

| Operation | CMult | CAdd | RMult | RAdd |
|---|---|---|---|---|
| $1/a = a^*/|a|^2$ | 0.5 | 0.5 | 2 | 1 |
| a * b | 1 | 1 | 4 | 2 |
| $\tilde{A} \times \tilde{B}$ | 8 | 4 | 32 | 24 |
| $\tilde{A}^{-1}$ | 6.5 | 1.5 | 26 | 3 |
| HInv $\tilde{A}$ | — | — | 7 | 2 |

TABLE III

Complexity Reduction for a 4 × 4 Matrix Inverse

| Architecture | RM |
|---|---|
| Traditional w/o DO(4 × 4) | 308 $L_F$ |
| Traditional w/ DO(4 × 4) | 244 $L_F$ |
| Hermitian Opt(4 × 4) | 90 $L_F$ |

Based on the above algorithmic optimization, the inventors have demonstrated the VLSI architecture and prototype of the RTL design on a Nallatech FPGA platform. The chip rate is in accordance with the WCDMA chip rate at 3.84 MHz, and the inventors applied a clock rate of 38.4 MHz for the Xilinx Virtex-II V6000 FPGA. The correlation window is set to 10 chips for all 4 receive antennas. The FFT size is 32-points. In the following are given the specification of the major design blocks: the throughput-mode correlation calculation, the multiple FFT/IFFT modules and the $L_F$ inverse of 4×4 sub-matrices. We utilize a Precision-C (now Catapult-C) based design methodology to study many area/time tradeoffs of the VLSI architecture design. For example, for the 16-FFT/IFFT modules, at one extreme, a fully parallel and pipelined architecture can be designed with parallel butterfly-units and complex multipliers laid out in the pattern of butterfly-tree. Since it is economically desirable to reduce the physical area, this is not practical. The merged multiple input multiple output FFT modules are designed to utilize the commonality in control logic and phase coefficient loading. Overall, only four multipliers are utilized to achieve area/time efficient design for this module. For the LF inverse of 4×4 Hermitian matrix, the latency is 38 Åsec with 6 multipliers. This benefits from the afore-mentioned architectural optimization.

TABLE IV

Area/Time Specifications of the Major FPGA Design Modules

| Architecture | Latency | CLB | ASICMult |
|---|---|---|---|
| Correlator | 1 chip | 22399 | 80 |
| 16 FFT32 | 44 As | 2530 | 4 |
| 32 MatInvMult (4 × 4) | 38 As | 4526 | 6 |

The current implementation of the invention is prototyped in FPGA platform, and the best mode is deemed to implement as ASIC architecture and integrate in the PHY processing engines in the communication chips. The current RTL can be targeted to the ASIC technology. The speed-critical elements include the scalable architectures for MIMO correlation, channel estimation, FIR filtering and the equalizer tap solver. An alternative would be to implement it in a high-end DSP processor. However, the DSP may not be able to provide enough parallelism and pipelining for the real-time processing of the time critical blocks with streaming input data.

The optimization reduces the number of FFTs and the number of real operations in the above sub-matrix inverse and multiplication. This facilitates the real-time implementation of the algorithm in VLSI architecture with reduced hardware resource. It also gives better stability to the fixed-point implementation. The principle operation of interest is the inverse many 4×4 matrices in the frequency domain. This leads to efficient architectures with 3× saving in complexity and more parallel and pipelined RTL schematic, which is verified in FPGA prototyping platform. This invention is deemed most advantageous for high-end CDMA devices with multiple antennas at both the transmitter and receiver. It is especially useful to simplify the receiver design with diversity order of up to 4, i.e., 4 receive antennas or 2 receive antennas with over sampling factor of 2, though the principles may be extended to other receivers with differing numbers of antennas.

Those skilled in the art should appreciate that an aspect of this invention pertains to a data storage medium storing program instructions to direct a data processor to equalize a signal received with at least two antennas from a multipath channel. The program instructions are operable to cause the data processor to perform an operation of equalizing the received signal by combining a Fourier transformed channel matrix with a Fourier transformed and inverted sub-matrix elements of a block circulant matrix $C_{rr}$ that is an approximation of a correlation matrix $R_{rr}$. The data storage medium may comprise part of a code division multiple access multiple input CDMA receiver.

While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. An apparatus configured to:
   generate a set of filter coefficients w from inverting a series of sub-matrices F, each of the sub-matrices of size no greater than 2×2 and representing an element of an approximated correlation matrix $C_{rr}$ for a spread spectrum signal received over a multipath channel, where said sub-matrices are each a block-diagonal matrix with elements taken from an element-wise fast Fourier transform of a column of the approximated correlation matrix;
   wherein the apparatus is configured to generate the set of filter coefficients by combining, as a matrix multiplication $F^{-1}H^{(D)}{}_m$, the inverted sub-matrices $F^{-1}$ with a fast Fourier transform of channel estimation coefficients h of a channel matrix H, where $F^{-1}$ represents the inversion of the sub-matrices F;
   the apparatus further configured to perform an inverse fast Fourier transform on the result of the multiplying to resolve a filter matrix W whose elements w comprise the set of filter coefficients; and the apparatus is further configured, for each $k^{th}$ filter coefficient, to matrix multiply the inverted and fast Fourier transformed columnar elements $$\vec{F}^{-1} = \begin{bmatrix} f_{0,0}(k) & f_{0,1}(k) \\ f_{1,0}(k) & f_{1,1}(k) \end{bmatrix}^{-1}$$

with a combination $\vec{\Gamma}_k=[\gamma_1(k)\gamma_2(k)]$ of the $k^{th}$ elements of the channel coefficients h in the Fourier transformed channel matrix H.

2. An apparatus as in claim 1, where said equalizer is a Linear-Minimum-Mean-Square-Error LMMSE equalizer.

3. An apparatus as in claim 1, where said equalizer is a Linear-Minimum-Mean-Square-Error LMMSE chip-level equalizer.

4. An apparatus as in claim 1, where said apparatus forms a part of a receiver that has either an even number of receive antennas greater than two or two receive antennas with oversampling at least twice per chip.

5. An apparatus as in claim 4, further configured to partition non-zero elements of the approximated correlation matrix $C_{rr}$ into mutually exclusive 2×2 sub-matrices B and to invert each of said partitioned sub-matrices.

6. An apparatus configured to:
generate a set of filter coefficients w by partitioning non-zero elements of an approximated correlation matrix $C_{rr}$ for a spread spectrum signal received over a multipath channel into mutually exclusive and inverted 2×2 sub-matrices B;
execute a fast Fourier transform on each of the partitioned sub-matrices;
thereafter to convert and combine the partitioned sub-matrices to form a matrix $$\vec{F}[i]^{-1} = \begin{bmatrix} \vec{C}_{11}[i] & \vec{C}_{12}[i] \\ \vec{C}_{21}[i] & \vec{C}_{22}[i] \end{bmatrix}, \text{ where}$$

$$\begin{cases} \vec{C}_{22}[i] = (\vec{B}_{22}[i] - \vec{B}_{21}[i]\vec{B}_{11}[i]^{-1}\vec{B}_{12}[i])^{-1} \\ \vec{C}_{12}[i] = -\vec{B}_{11}[i]^{-1}\vec{B}_{12}[i]\vec{C}_{22}[i] \\ \vec{C}_{21}[i] = -\vec{C}_{22}[i]\vec{B}_{21}[i]\vec{B}_{11}[i]^{-1} \\ \vec{C}_{11}[i] = \vec{B}_{11}[i]^{-1} - \vec{C}_{12}[i]\vec{B}_{21}[i]\vec{B}_{11}[i]^{-1} \end{cases} ;$$

and thereafter to multiply the matrix $F^{-1}$ by a Fourier transformed channel matrix to yield $F^{-1}H^{(D)}_m$, and thereafter to execute an inverse fast Fourier transform on $F^{-1}H^{(D)}_m$.

7. The apparatus of claim 6, configured for each 2×2 sub-matrix B, to determine only three elements, to store at least the independently determined three elements, and to determine a fourth element from at least one of the stored three elements.

8. The apparatus as in claim 7 configured to generate the set of filter coefficients by three separate calculation operations on the three stored elements, the calculation operations comprising:
a diagonal transform $T(\vec{A})=T(\vec{A}_{11}, \vec{A}_{21}\vec{A}_{22})$ of an input 2×2 matrix $\vec{A}$;
a Hermitian inverse operation HINV of an input 2×2 Hermitian matrix; and
a Complex-Hermitian-Multiplication $$M(\vec{A}, \vec{B}) = \vec{A}\vec{B} = \begin{bmatrix} a_{11} & a_{12} \\ a_{21} & a_{22} \end{bmatrix}\begin{bmatrix} b_{11} & b_{21}^* \\ b_{21} & b_{22} \end{bmatrix}$$

of two input 2×2 matrices.

9. The apparatus as in claim 8 disposed within a receiver, where the set of filter coefficients for each $k^{th}$ spreading code are $g_{11}=(a_{11}\circ b_{11})*a_{11}+[a_{12}*b_{21}*a_{11}*+a_{11}*b_{21}*a_{12}*]+ (a_{12}\circ b_{22})*a_{12}*;$ $g_{21}=d_{21}*a_{11}*+d_{22}*a_{12}*;$ $g_{12}=d_{21}*a_{11}*+d_{22}*a_{12};$ and $g_{22}=(a_{21}\circ b_{21})*a_{21}*+[a_{22}*b_{21}*a_{21}*+a_{21}*b_{21}*a_{22}*]+ (a_{22}\circ b_{22})*a_{22}*.$ 10. The apparatus as in claim 9, configured to store at least some computational combinations for which the apparatus is configured to reuse in the determination of each $k^{th}$ spreading code filter coefficient.

11. The apparatus as in claim 10 where the set of filter coefficients for each $k^{th}$ spreading code are $$\begin{cases} g_{11} = pPow(tmp1, a_{11}^*) + 2\text{Re}(tmp2, a_{11}^*) + pPow(tmp3, a_{12}^*) \\ g_{21} = d_{21} * a_{11}^* + d_{22} * a_{12}^* \\ g_{12} = g_{21}^* \\ g_{22} = pPow(tmp5, a_{21}^*) + 2\text{Re}(tmp6, a_{21}^*) + pPow(tmp7, a_{22}^*) \end{cases} ;$$

where tmp1, tmp2, tmp3, tmp5, tmp6, and tmp7 are values of computational combinations stored in memory, $d_{21}$ and $d_{22}$ are elements of a 2×2 matrix D resulting from a Complex Hermitian Multiplication of matrices B and A, and pPow(a)=Re(a).Re(b)+Im(a).Im(b) for two complex numbers a and b.

12. The apparatus of claim 1, where said apparatus comprises an equalizer that is implemented using circuitry.

13. The apparatus of claim 1, where said apparatus comprises an equalizer that is implemented using software.

14. The apparatus of claim 1, where said apparatus comprises an equalizer that is implemented using a combination of circuitry and software.

15. The apparatus of claim 1, where said apparatus comprises a multiple input code division multiple access CDMA receiver.

16. The apparatus of claim 1, where said apparatus comprises a multiple input, multiple output MIMO code division multiple access CDMA receiver.

17. The apparatus of claim 6, wherein the apparatus comprises a Linear-Minimum-Mean-Square-Error LMMSE equalizer.

18. The apparatus of claim 6, wherein the apparatus comprises a Linear-Minimum-Mean-Square-Error LMMSE chip-level equalizer.

19. The apparatus of claim 6, wherein the apparatus comprises an equalizer that forms a part of a code division multiple access CDMA receiver having a multiple input, multiple output MIMO architecture.

20. A method, comprising:
receiving a signal from a multipath channel with at least two receive antennas; and
equalizing the received signal by combining a Fourier transformed channel matrix with a Fourier transformed and inverted sub-matrix elements of a block circulant matrix $C_{rr}$ that is an approximation of a correlation matrix $R_{rr}$, where said combining comprises a matrix multiplication $F^{-1}H^{(D)}_m$, where H is a channel matrix;

performing an inverse fast Fourier transform on $F^{-1}H^{(D)}_m$ resolve a filter matrix W whose elements w comprise a set of FIR filter coefficients;

for each $k^{th}$ filter coefficient, inverting the Fourier transformed sub-matrix elements $$\vec{F}^{-1} = \begin{bmatrix} f_{0,0}(k) & f_{0,1}(k) \\ f_{1,0}(k) & f_{1,1}(k) \end{bmatrix}^{-1};$$

and matrix multiplying the sub-matrix elements with a combination $\vec{\Gamma}_k = [\gamma_1(k)\gamma_2(k)]$ of the $k^{th}$ elements of the channel coefficients h in the Fourier transformed channel matrix H.

21. A method as in claim 20, where said combining a Fourier transformed channel matrix with a Fourier transformed and inverted sub-matrix elements of a block circulant matrix $C_{rr}$ is implemented by a tap solver having an output coupled to a Finite Impulse Response filter.

22. A method as in claim 20, where equalizing uses a Linear-Minimum-Mean-Square-Error LMMSE technique.

23. A method as in claim 20, where equalizing uses a Linear-Minimum-Mean-Square-Error LMMSE chip-level technique.

24. A method as in claim 20, where receiving and equalizing occur within a code division multiple access multiple input CDMA receiver.

25. A method as in claim 20 where all matrices that are inverted to resolve a set of filter coefficients are of dimensions 2×2.

26. A method as in claim 20 where the inverted sub-matrix elements are of dimension greater than 2×2, the method further comprising:

partitioning the sub-matrix elements into mutually exclusive block sub-matrices and inverting each.

27. A method comprising:

receiving a signal from a multipath channel with at least two receive antennas; and equalizing the received signal by combining a Fourier transformed channel matrix H with Fourier transformed and inverted sub-matrix elements of a block circulant matrix $C_{rr}$ that is an approximation of a correlation matrix $R_{rr}$;

for the case where the inverted sub-matrix elements are of dimension greater than 2×2, partitioning the sub-matrix elements into mutually exclusive block sub-matrices and inverting each of the partitioned block sub-matrices, where the Fourier transform is executed on each of the partitioned sub-matrices B, which are converted and combined to form a matrix $$\vec{F}[i]^{-1} = \begin{bmatrix} \vec{C}_{11}[i] & \vec{C}_{12}[i] \\ \vec{C}_{21}[i] & \vec{C}_{22}[i] \end{bmatrix},$$

where 
$$\begin{cases} \vec{C}_{22}[i] = (\vec{B}_{22}[i] - \vec{B}_{21}[i]\vec{B}_{11}[i]^{-1}\vec{B}_{12}[i])^{-1} \\ \vec{C}_{12}[i] = -\vec{B}_{11}[i]^{-1}\vec{B}_{12}[i]\vec{C}_{22}[i] \\ \vec{C}_{21}[i] = -\vec{C}_{22}[i]\vec{B}_{21}[i]\vec{B}_{11}[i]^{-1} \\ \vec{C}_{11}[i] = \vec{B}_{11}[i]^{-1} - \vec{C}_{12}[i]\vec{B}_{21}[i]\vec{B}_{11}[i]^{-1} \end{cases};$$

that is multiplied by the Fourier transformed channel matrix to yield $F^{-1}H^{(D)}_m$, and executing an inverse fast Fourier transform on $F^{-1}H^{(D)}_m$.

28. A method as in claim 27 where the combining is executed by an arrangement of three separate calculation operations, the calculation operations comprising:

a diagonal transform $T(\vec{A}) = T(\vec{A}_{11}, \vec{A}_{21}\vec{A}_{22})$ of an input 2×2 matrix $\vec{A}$;

a Hermitian inverse operation HINV of an input 2×2 Hermitian matrix; and a Complex-Hermitian-Multiplication $$M(\vec{A}, \vec{B}) = \vec{A}\vec{B} = \begin{bmatrix} a_{11} & a_{12} \\ a_{21} & a_{22} \end{bmatrix} \begin{bmatrix} b_{11} & b_{21}^* \\ b_{21} & b_{22} \end{bmatrix}$$

of two input 2×2 matrices.

29. A method as in claim 28 further comprising generating a set of filter coefficients from the combining, the filter coefficients comprising, for each $k^{th}$ spreading code of the received signal:

$g_{11} = (a_{11} \circ b_{11})^* a_{11} + [a_{12}^* b_{21}^* a_{11}^* + a_{11}^* b_{21}^* a_{12}^*] + (a_{12} \circ b_{22})^* a_{12};$ $g_{21} = d_{21}^* a_{11}^* + d_{22}^* a_{12};$ $g_{12} = d_{21}^* a_{11}^* + d_{22}^* a_{12};$ and $g_{22} = (a_{21} \circ b_{21})^* a_{21}^* + [a_{22}^* b_{21}^* a_{21}^* + a_{21}^* b_{21}^* a_{22}^*] + (a_{22} \circ b_{22})^* a_{22}.$ 30. A method as in claim 29 further comprising generating a set of filter coefficients from the combining, the filter coefficients comprising, for each $k^{th}$ spreading code of the received signal:

$$\begin{cases} g_{11} = pPow(tmp1, a_{11}^*) + 2\text{Re}(tmp2, a_{11}^*) + pPow(tmp3, a_{12}^*) \\ g_{21} = d_{21} * a_{11}^* + d_{22} * a_{12}^* \\ g_{12} = g_{21}^* \\ g_{22} = pPow(tmp5, a_{21}^*) + 2\text{Re}(tmp6, a_{21}^*) + pPow(tmp7, a_{22}^*) \end{cases};$$

where tmp1, tmp2, tmp3, tmp5, tmp6, and tmp7 are values of computational combinations determined and stored in memory, $d_{21}$ and $d_{22}$ are elements of a 2×2 matrix D resulting from a Complex Hermitian Multiplication of matrices B and A, and $pPow(a\ b) = \text{Re}(a).\text{Re}(b) + \text{Im}(a).\text{Im}(b)$ for two complex numbers a and b.

31. A data storage medium storing program instructions to direct a data processor to equalize a signal received with at least two antennas from a multipath channel, comprising an operation of equalizing the received signal by combining a Fourier transformed channel matrix with a Fourier transformed and inverted sub-matrix elements of a block circulant matrix $C_{rr}$ that is an approximation of a correlation matrix $R_{rr}$, where said combining comprises a matrix multiplication on $F^{-1}H^{(D)}_m$, where H is a channel matrix;

performing an inverse fast Fourier transform on $F^{-1}H^{(D)}_m$ to resolve a filter matrix W whose elements w comprise a set of FIR filter coefficients;

for each $k^{th}$ filter coefficient, inverting the Fourier transformed sub-matrix elements $$\vec{F}^{-1} = \begin{bmatrix} f_{0,0}(k) & f_{0,1}(k) \\ f_{1,0}(k) & f_{1,1}(k) \end{bmatrix}^{-1};$$

and matrix multiplying the sub-matrix elements with a combination $\vec{\Gamma}_k = [\gamma_1(k)\gamma_2(k)]$ of the $k^{th}$ elements of the channel coefficients h in the Fourier transformed channel matrix H.

32. A data storage medium as in claim 31, where the operation of combining the Fourier transformed channel matrix with the Fourier transformed and inverted sub-matrix elements of the block circulant matrix $C_{rr}$ comprises operating a tap solver having an output coupled to a Finite Impulse Response filter.

33. A data storage medium as in claim 31, where the equalizing operation uses a Linear-Minimum-Mean-Square-Error LMMSE technique.

34. A data storage medium as in claim 31, where the equalizing operation uses a Linear-Minimum-Mean-Square-Error LMMSE chip-level technique.

35. A data storage medium as in claim 31, where said data storage medium comprises part of a code division multiple access multiple input CDMA receiver.

* * * * *

UNITED STATES PATENT AND TRADEMARK OFFICE
CERTIFICATE OF CORRECTION

PATENT NO. : 7,492,815 B2
APPLICATION NO. : 10/997397
DATED : February 17, 2009
INVENTOR(S) : Guo et al.

It is certified that error appears in the above-identified patent and that said Letters Patent is hereby corrected as shown below:

In The Claims:

Claim 1, column 17, line 11, after "channel" insert --estimation--.

Claim 9, column 18, lines 10-18, please delete the equations and replace with the following:

$$g_{11} = (a_{11} \circ b_{11}) * a_{11} + [a_{12} * b_{21} * a_{11}^* + a_{11} * b_{21}^* * a_{12}^*] + (a_{12} \circ b_{22}) * a_{12}^*;$$

$$g_{21} = d_{21} * a_{11}^* + d_{22} * a_{12}^*;$$

$$g_{12} = d_{21} * a_{11}^* + d_{22} * a_{12}; \text{ and}$$

$$g_{22} = (a_{21} \circ b_{21}) * a_{21}^* + [a_{22} * b_{21} * a_{21}^* + a_{21} * b_{21}^* * a_{22}^*] + (a_{22} \circ b_{22}) * a_{22}^*$$

Claim 20, column 19, line 6, before "resolve" insert --to--.

Claim 29, column 20, lines 35-41 please delete the equations and replace with the following:

$$g_{11} = (a_{11} \circ b_{11}) * a_{11} + [a_{12} * b_{21} * a_{11}^* + a_{11} * b_{21}^* * a_{12}^*] + (a_{12} \circ b_{22}) * a_{12}^*;$$

$$g_{21} = d_{21} * a_{11}^* + d_{22} * a_{12}^*;$$

$$g_{12} = d_{21} * a_{11}^* + d_{22} * a_{12}; \text{ and}$$

$$g_{22} = (a_{21} \circ b_{21}) * a_{21}^* + [a_{22} * b_{21} * a_{21}^* + a_{21} * b_{21}^* * a_{22}^*] + (a_{22} \circ b_{22}) * a_{22}^*$$

Claim 31, column 21, line 2 please delete "on".

Signed and Sealed this
Twenty-second Day of February, 2011

David J. Kappos
*Director of the United States Patent and Trademark Office*